US012054970B2

(12) United States Patent
Komadina et al.

(10) Patent No.: US 12,054,970 B2
(45) Date of Patent: Aug. 6, 2024

(54) PUSH PAD EXIT DEVICE FOR EMERGENCY DOOR EGRESS AND VERTICAL LATCH BOLT ASSEMBLY

(71) Applicant: C.R. Laurence Co., Inc., Los Angeles, CA (US)

(72) Inventors: Mirjana Komadina, Los Angeles, CA (US); Gary Sprague, Los Angeles, CA (US)

(73) Assignee: C.R. LAURENCE CO., INC., Los Angeles, CA (US)

( * ) Notice: Subject to any disclaimer, the term of this patent is extended or adjusted under 35 U.S.C. 154(b) by 0 days.

(21) Appl. No.: 18/351,874

(22) Filed: Jul. 13, 2023

(65) Prior Publication Data

US 2023/0407679 A1 Dec. 21, 2023

Related U.S. Application Data

(63) Continuation-in-part of application No. 17/850,451, filed on Jun. 27, 2022, now Pat. No. 11,746,966, and a continuation-in-part of application No. 17/460,010, filed on Aug. 27, 2021, now Pat. No. 11,821,238, which is a continuation of application No. 15/956,241, filed on Apr. 18, 2018, now Pat. No. 11,118,378.

(51) Int. Cl.

| | |
|---|---|
| ***E05B 65/10*** | (2006.01) |
| ***E05B 15/10*** | (2006.01) |
| ***E05C 3/16*** | (2006.01) |

(52) U.S. Cl.

CPC ...... *E05B 65/1093* (2013.01); *E05B 65/1006* (2013.01); *E05B 65/1053* (2013.01); *E05C 3/162* (2013.01); *E05B 2015/107* (2013.01)

(58) Field of Classification Search

CPC ............ E05B 65/1093; E05B 65/1006; E05B 65/1053; E05B 2015/107; E05B 67/365; E05B 15/006; E05C 3/162

See application file for complete search history.

(56) References Cited

U.S. PATENT DOCUMENTS

| | | | |
|---|---|---|---|
| 89,942 | A | 5/1869 | Quayle |
| 288,028 | A | 11/1883 | Coultaus |

(Continued)

FOREIGN PATENT DOCUMENTS

| | | |
|---|---|---|
| DE | 299 01 960 | 6/1999 |
| DE | 202010001358 | 6/2011 |

(Continued)

*Primary Examiner* — Christine M Mills
*Assistant Examiner* — Faria F Ahmad
(74) *Attorney, Agent, or Firm* — Cislo & Thomas, LLP

(57) ABSTRACT

A push pad exit device comprising a horizontal push bar actuator mechanically linked to a vertical door handle assembly for use on the interior side of entrance doors where a means of emergency egress is desired, is presented. The operating mechanisms of the push bar actuator and vertical door handle assembly are concealed presenting a smooth uncluttered appearance. The push pad exit device further including an improved roller latch bolt. The improved roller latch bolt allows for a roller to make contact with a ramp surface of a corresponding strike plate on a sweep side of the plate and allows for the roller support to make contact with the strike plate on a latch side of the plate.

12 Claims, 17 Drawing Sheets

(56) References Cited

U.S. PATENT DOCUMENTS

| | | | | |
|---|---|---|---|---|
| 354,559 | A | 12/1886 | Lempert | |
| 380,367 | A | 4/1888 | Tyden | |
| 385,400 | A | 7/1888 | Bachman | |
| 770,642 | A | 9/1904 | Hyers | |
| 783,033 | A | 2/1905 | Fraser | |
| 792,129 | A | 6/1905 | Heard | |
| 874,659 | A | 12/1907 | Conklin | |
| 995,831 | A | 6/1911 | Winter | |
| 1,038,111 | A | 9/1912 | Foss | |
| 1,057,995 | A | 4/1913 | Bull | |
| 1,111,426 | A | 9/1914 | Ziganek et al. | |
| 1,145,471 | A | 7/1915 | Dobrick | |
| 1,179,606 | A | 4/1916 | Bull et al. | |
| 1,180,813 | A | 4/1916 | Ziganek | |
| 1,194,637 | A | 8/1916 | Joy | |
| 1,214,230 | A | 1/1917 | Sheppard | |
| 1,256,992 | A * | 2/1918 | Edgar et al. | E05B 85/22 292/DIG. 31 |
| 1,378,504 | A | 5/1921 | White | |
| 1,417,815 | A | 5/1922 | Fischer | |
| 1,486,595 | A | 3/1924 | Marcum | |
| 1,533,826 | A * | 4/1925 | Butterworth | E05B 59/00 292/193 |
| 2,066,080 | A | 12/1936 | Emory | |
| 2,349,301 | A | 5/1944 | Overby | |
| 2,445,119 | A | 7/1948 | Ledin | |
| 2,503,076 | A | 4/1950 | Smith | |
| 2,604,343 | A | 7/1952 | Fredholm | |
| 2,627,081 | A | 2/1953 | Slopa | |
| 2,660,464 | A | 11/1953 | Rosenblum | |
| 2,660,465 | A | 11/1953 | Gerson | |
| 2,670,979 | A | 3/1954 | Fernandez | |
| 2,680,036 | A | 6/1954 | Gill | |
| 2,714,029 | A | 7/1955 | Loeb | |
| 2,785,915 | A | 3/1957 | Daffurn et al. | |
| 2,792,244 | A | 5/1957 | Loeb | |
| 2,832,623 | A | 4/1958 | Golemon | |
| 2,983,536 | A | 5/1961 | Heyer et al. | |
| 3,141,691 | A | 7/1964 | Gunard | |
| 3,151,900 | A | 10/1964 | Ahlgren | |
| 3,163,452 | A | 12/1964 | Bryson et al. | |
| 3,239,261 | A | 3/1966 | Bryson et al. | |
| 3,287,043 | A * | 11/1966 | Delhase | E05C 19/04 292/9 |
| 3,561,803 | A | 2/1971 | Schlage | |
| 3,663,047 | A | 5/1972 | Zawadzki | |
| 3,670,537 | A | 6/1972 | Horgan, Jr. | |
| 3,696,648 | A | 10/1972 | Horgan, Jr. | |
| 3,910,611 | A * | 10/1975 | Slovensky, Jr. | E05B 53/003 292/DIG. 31 |
| 4,366,974 | A | 1/1983 | Horgan, Jr. | |
| 4,382,620 | A | 5/1983 | Horgan, Jr. | |
| 4,418,949 | A | 12/1983 | Horgan, Jr. | |
| 4,506,922 | A | 3/1985 | Horgan, Jr. | |
| 4,641,865 | A | 2/1987 | Pastva | |
| 4,711,480 | A | 12/1987 | Horgan, Jr. | |
| 4,819,976 | A | 4/1989 | Bert | |
| 4,895,399 | A | 1/1990 | Horgan, Jr. | |
| 4,961,330 | A | 10/1990 | Evans | |
| 5,203,115 | A | 4/1993 | Marinoni | |
| 5,456,504 | A * | 10/1995 | Brillant | E05B 63/248 292/DIG. 26 |
| 5,464,259 | A | 11/1995 | Cohrs et al. | |
| 5,938,248 | A | 8/1999 | Vickers et al. | |
| 6,000,733 | A | 12/1999 | Linder | |
| 6,511,104 | B1 | 1/2003 | Horgan, Jr. | |
| 6,592,156 | B2 * | 7/2003 | Levine | E05C 19/04 292/341.15 |
| 6,746,060 | B2 * | 6/2004 | O'Brien, II | E05B 65/1046 292/DIG. 57 |
| 6,820,905 | B1 | 11/2004 | Haeck et al. | |
| 7,044,510 | B2 * | 5/2006 | Lin | E05B 65/104 292/93 |
| 7,513,542 | B2 * | 4/2009 | Schumm | E05C 17/446 292/173 |
| 7,887,107 | B2 | 2/2011 | Shen | |
| 9,303,444 | B1 | 4/2016 | Choi | |
| 9,580,944 | B2 | 2/2017 | Arlinghaus et al. | |
| 11,118,378 | B1 | 9/2021 | Sprague | |
| 11,821,238 | B2 * | 11/2023 | Sprague | E05C 3/162 |
| 2002/0100234 | A1 | 8/2002 | Sprague | |
| 2004/0094973 | A1 | 5/2004 | Sprague | |
| 2005/0144822 | A1 | 7/2005 | Molokotos et al. | |
| 2005/0184531 | A1 | 8/2005 | Lin | |
| 2007/0046038 | A1 | 3/2007 | Schlack et al. | |
| 2009/0113955 | A1 | 5/2009 | Ambrass | |
| 2009/0194999 | A1 | 8/2009 | Shen | |
| 2010/0066101 | A1 | 3/2010 | Shen | |
| 2010/0109352 | A1 | 5/2010 | Tien et al. | |
| 2010/0117376 | A1 | 5/2010 | Shen | |
| 2013/0127184 | A1 | 5/2013 | Tien | |
| 2013/0154283 | A1 | 6/2013 | Arlinghaus et al. | |
| 2014/0132009 | A1 | 5/2014 | Chiang et al. | |
| 2015/0033629 | A1 | 2/2015 | Barwick et al. | |
| 2015/0159410 | A1 | 6/2015 | Stallbaumer | |
| 2015/0330120 | A1 | 11/2015 | Hogan et al. | |
| 2016/0002961 | A1 | 1/2016 | Graham | |
| 2016/0002963 | A1 | 1/2016 | Kondi et al. | |
| 2016/0376816 | A1 | 12/2016 | Graham | |
| 2017/0191288 | A1 | 7/2017 | Lin | |
| 2017/0218662 | A1 | 8/2017 | Thompson et al. | |
| 2020/0370332 | A1 | 11/2020 | Baker et al. | |

FOREIGN PATENT DOCUMENTS

| | | |
|---|---|---|
| EP | 1 405 979 | 4/2004 |
| JP | 3073659 | 8/2000 |
| JP | 2013213375 | 10/2013 |

* cited by examiner

PUSH PAD EXIT DEVICE FOR EMERGENCY DOOR EGRESS AND VERTICAL LATCH BOLT ASSEMBLY

CROSS-REFERENCES TO RELATED APPLICATION

This patent application is a Continuation-in-Part of U.S. application Ser. No. 17/850,451 filed on Aug. 3, 2022, entitled "Improved Vertical Latch Bolt," and a Continuation-in-Part of U.S. patent application Ser. No. 17/460,010 filed on Aug. 27, 2021, which is a continuation of U.S. application Ser. No. 15/956,241, (now U.S. Pat. No. 11,118,378), filed Apr. 18, 2018, both entitled "Push Pad Exit Device for Emergency Door Egress," each of which is incorporated herein by this reference.

FIELD OF THE INVENTION

The present invention relates generally to panic handles for doors and more particularly to panic handles featuring a horizontally oriented push bar mechanically connected to a vertically oriented latch mechanism and to an improved vertical latch bolt having improved resistance to attempts at forced entry.

BACKGROUND OF THE INVENTION

A panic handle exit device allows persons within the interior of a room or building to readily open a door in a latched position by simply pushing on an interior handle for unlatching the door. The interior handles of a panic handle exit device typically comprise a push bar mounted to the door.

The push bar is mechanically linked to a door latch mechanism which includes a latch bolt for locking and unlocking the door. The push bar is typically movable in a pivoting motion from a locked position to an unlocked position to actuate the door latch mechanism when pressure is applied along the surface of the push bar. Depressing the push bar toward the door translates a mechanical linkage for actuating the door latch mechanism in order to retract the door latch bolt so that the door can be opened. A primary benefit of panic exit devices is that they provide unlatching of the door in a quick and simple manner. For this reason, panic exit devices are often utilized in applications which require ready exit from a building in case of an emergency.

A latch bolt is a component of a door latch assembly. Vertical door latches are door latches commonly used in commercial and public buildings. In a vertical door latch installation, the door latches are located at either the top or bottom edges of the door and not infrequently, at both the top and bottom edges. Vertical door latch assemblies are designed to include spring loaded, vertically oriented latch bolts that extend upwardly out of the top edge of the door or extend downwardly from the bottom edge of the door and are engageable with an opening in a strike plate mounted in the door frame, or adjacent floor or ceiling. Strike plates typically include ramps that guide latch bolts into engagement with the sockets of the strike plates. Vertical latch bolts may include a head portion having an angled face that engages with and slides along the ramp of a strike plate or may feature a roller which engages the ramp of the strike plate.

An issue that arises in doors featuring vertical latch assemblies is whether to use latch bolts with roller heads or those with angled faces, i.e., non-roller heads. Roller latch bolts are well-known for their smooth operation and are known to be effective in securing a door. Non-roller latch bolts, which use angled faces to engage the strike plates, require, generally, more force to operate and have a less smooth "feel" in operation in comparison to roller latch bolts due to the sliding nature of their engagement with the strike plates. A non-roller latch bolt having an angled face, may, however, offer more security than a roller latch bolt when engaged in a strike plate.

While many panic handle and latch bolt designs are known in the art, there remains room for improvement. What is needed is an effective, easy to operate push pad exit device that conceals most or all of its working components and a vertical latch bolt that combines the smooth operation of a roller head latch bolt with the potential increase in security offered by a non-roller latch bolt having an angled face.

SUMMARY OF THE INVENTION

The present invention improves upon the prior art by providing an easy to operate push pad exit device in which the internal components are concealed in combination with an improved vertical latch bolt that combines the smooth operation of a roller head latch bolt with the potentially greater security of an angled face latch bolt, i.e. non-roller latch bolt.

The push pad exit device features a push pad actuator mounted horizontally onto an interior surface of a door, fixedly connected to the door at the door's hinge side, and fixedly mounted to a vertically oriented door handle assembly located on the interior surface of the door at the door's latch side. The interior vertical handle assembly is fixedly mounted to the interior surface of a door at the bottom and/or top of the door, and at a centrally located interior housing located on the interior surface of the door. The interior vertical handle assembly conceals a latch mechanism comprising linkages that operate the latching bolt assemblies at the top and/or bottom of the door.

The push pad actuator and associated interior vertical handle assembly will typically be used on building entrance doors and other doors where emergency egress is desired. The push pad actuator and interior vertical handle assembly optionally include a "dogging" feature wherein the dogging feature holds the latch mechanism in the unlatched or unlocked position and thereby allows the door to open and close freely from the exterior surface or side of the door, which typically corresponds to the exterior of a building or room from which emergency egress is desired.

In addition, the door may be equipped with a centrally located exterior housing on its exterior surface that includes a key-lock mechanism which communicates with the centrally located interior housing via a push rod that defeats the latch mechanism and thereby allows a user to unlock a locked door from the outside.

Experimentation has shown that locating the push bar actuator and centrally located interior and exterior housings at a position of about 42" above a finished floor, is the most ergonomically desirable position for a majority of users. In one preferred embodiment for use with glass doors, a fixed exterior vertical handle is located adjacent the interior vertical handle such that the exterior and interior handles appear as one continuous handle. It is preferable that the interior and exterior vertical door handles are both the full height of the door. It is further desirable that the push pad actuator be visibly labeled with a "PUSH" indicator, which may be engraved on the actuator.

The improved vertical latch bolt of the present invention asymmetrically locates a roller within a roller support. Asymmetric location of the roller allows for the roller to make contact with a ramp surface of a corresponding strike plate on a sweep side of the plate and allows for the roller support to make contact with a vertical latch surface of the strike plate on a latch side of the plate, when the improved roller latch bolt is disposed within the socket of the strike plate. The improved vertical latch bolt maintains the smooth operation of prior art roller latch bolts while also providing the increased door security and other benefits of prior art non-roller latch bolts.

The above and other advantages of the push pad exit device and improved roller latch bolt of the present invention will be described in more detail below.

DETAILED DESCRIPTION OF THE PREFERRED EMBODIMENTS

The present invention will now be described more fully hereinafter with reference to the accompanying drawings, in which preferred embodiments of the invention are shown. The invention may, however, may be embodied in many different forms and should not be construed as being limited to the embodiments set forth herein. Rather these embodiments are provided so that this disclosure will be thorough and complete, and will fully convey the scope of the invention to those skilled in the art. Like numbers refer to like elements throughout.

Push Pad Exit Device

Figure 1:
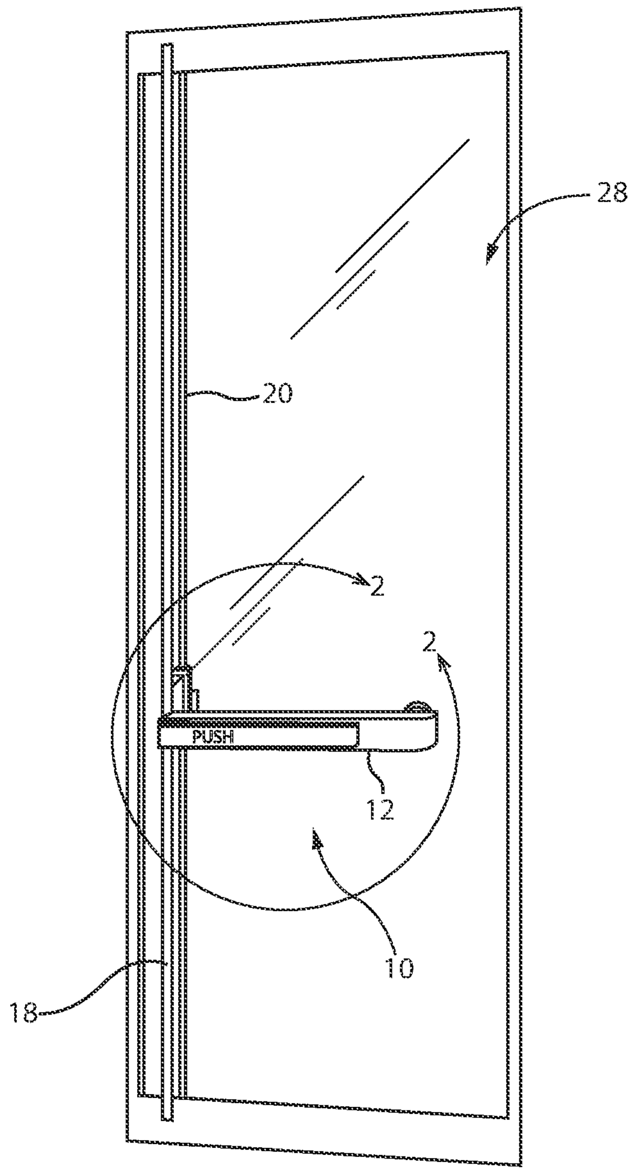
FIG. 1 is a perspective view of a glass door with the push pad exit device of the present invention installed.
Figure 2:
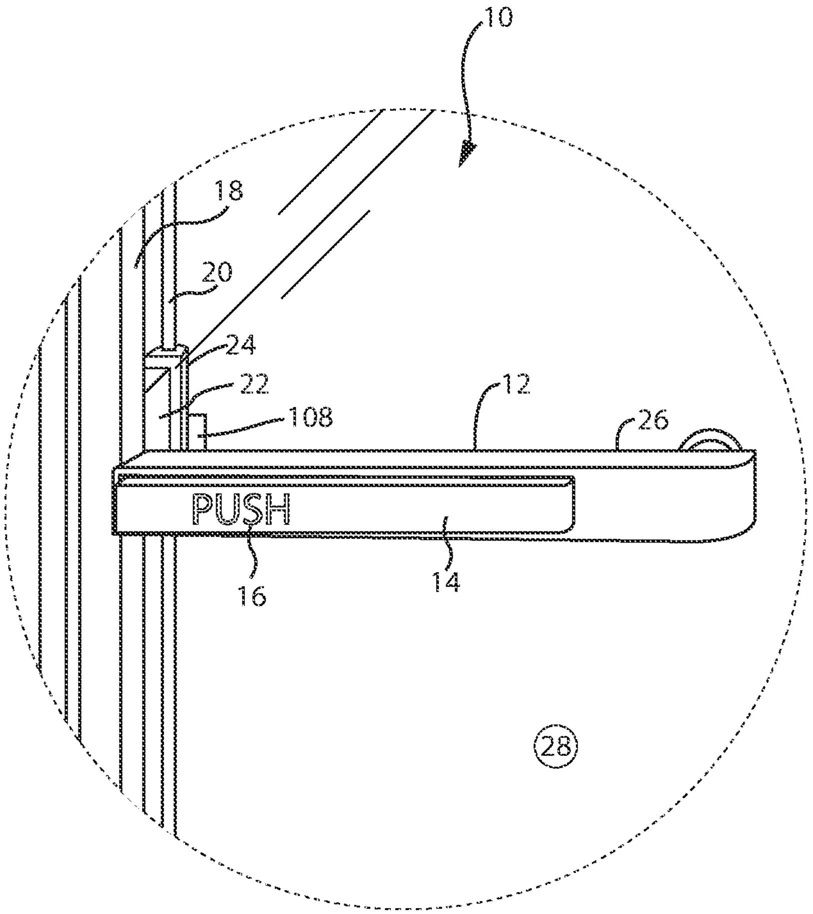
FIG. 2 is an enlarged detail view showing the push pad exit device of FIG. 1 installed on a glass door.
Figure 3:
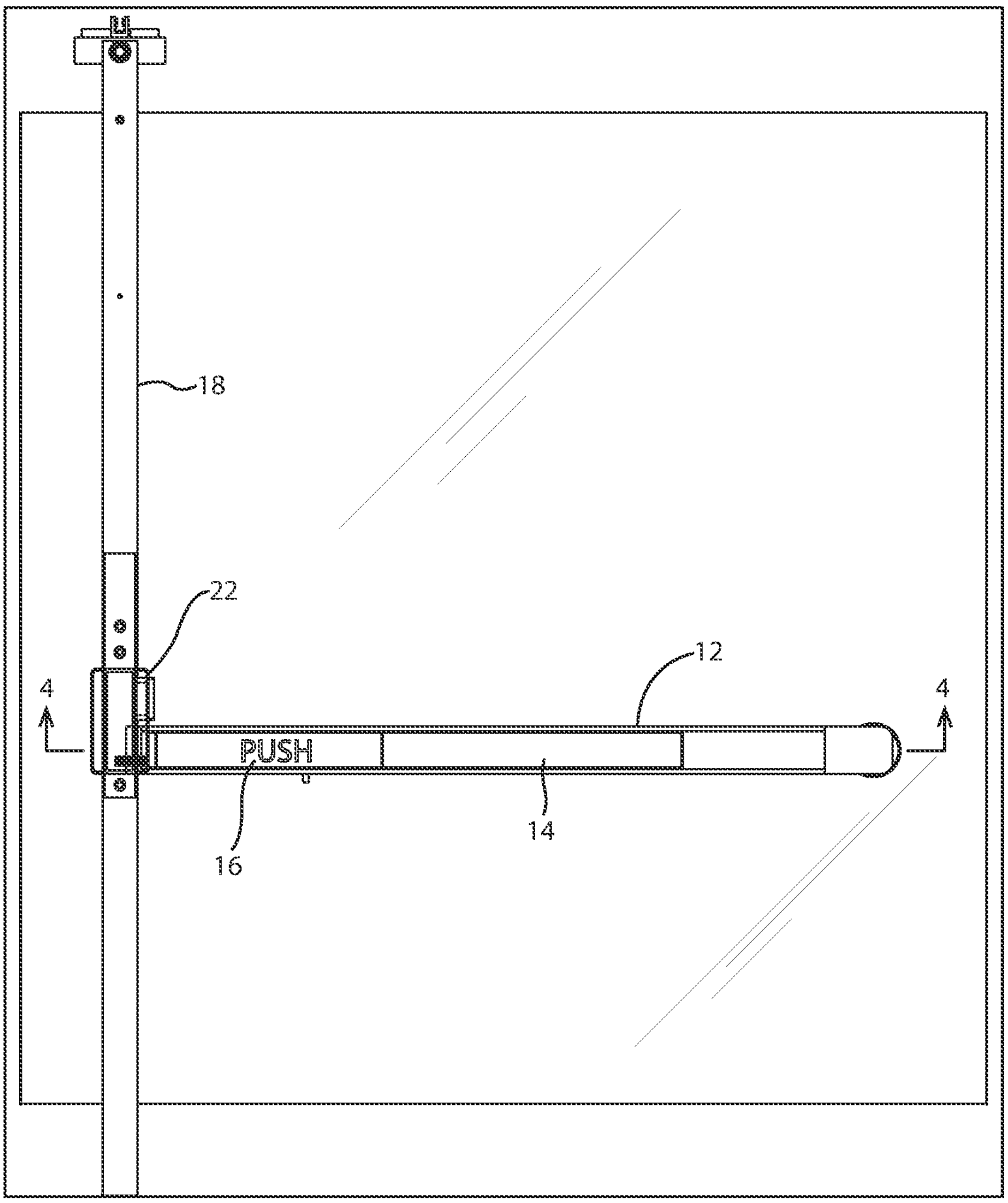
FIG. 3 is a front plan view of the push pad exit device of FIG. 1.

With reference to FIGS. 1 and 2, the appearance of the push pad exit device 10 of the present invention is shown. The push pad exit device 10 generally comprises a horizontal push pad actuator 12, an interior vertical door handle 18, an exterior vertical door handle assembly 20 (optional), a centrally located interior housing 22, a centrally located exterior housing 24 (optional) and a lock 108 (optional).

As shown by FIGS. 1 and 2, the horizontal push pad actuator 12, interior vertical door handle 18, exterior vertical door handle assembly 20, centrally located interior housing 22, and centrally located exterior housing 24 are mounted to a door 28. In typical installations, the door 28 will be either a single or double pane glass door.

Figure 4A:
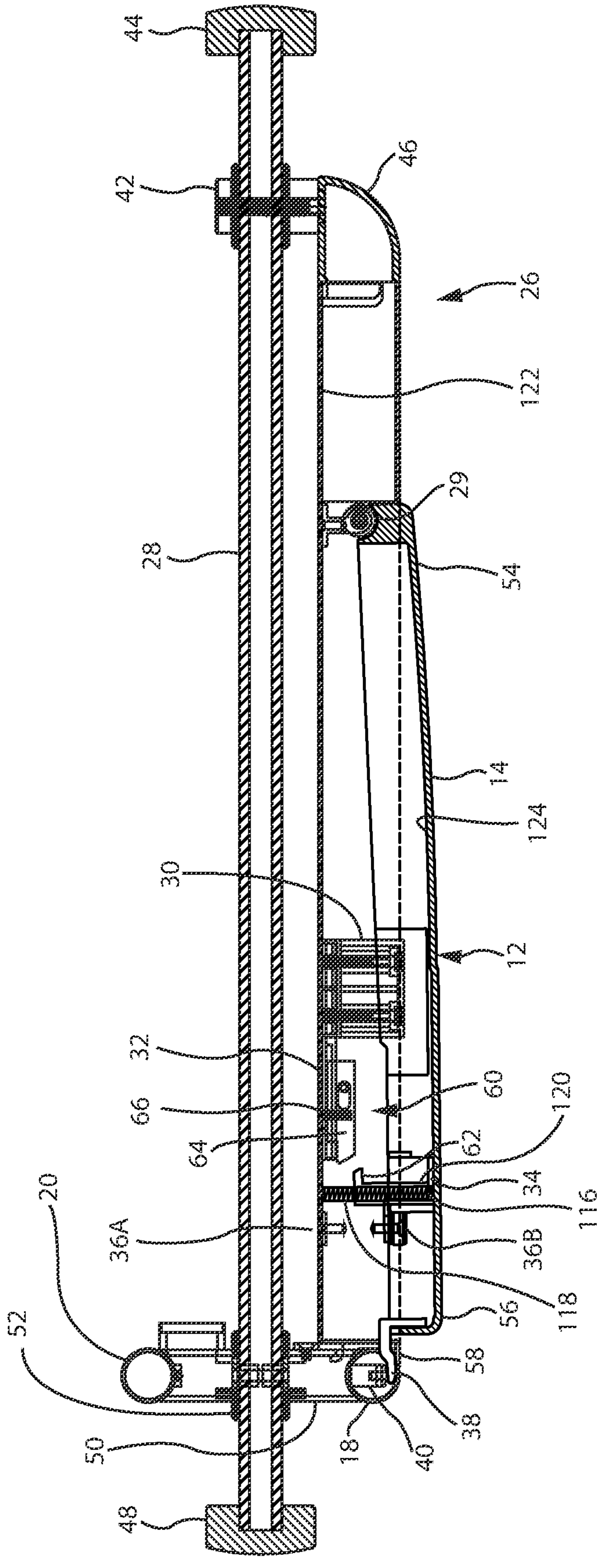
FIG. 4A is a sectional view of the push pad exit device taken along the line 4-4 of FIG. 3, showing the push pad actuator in the latched position.
Figure 4B:
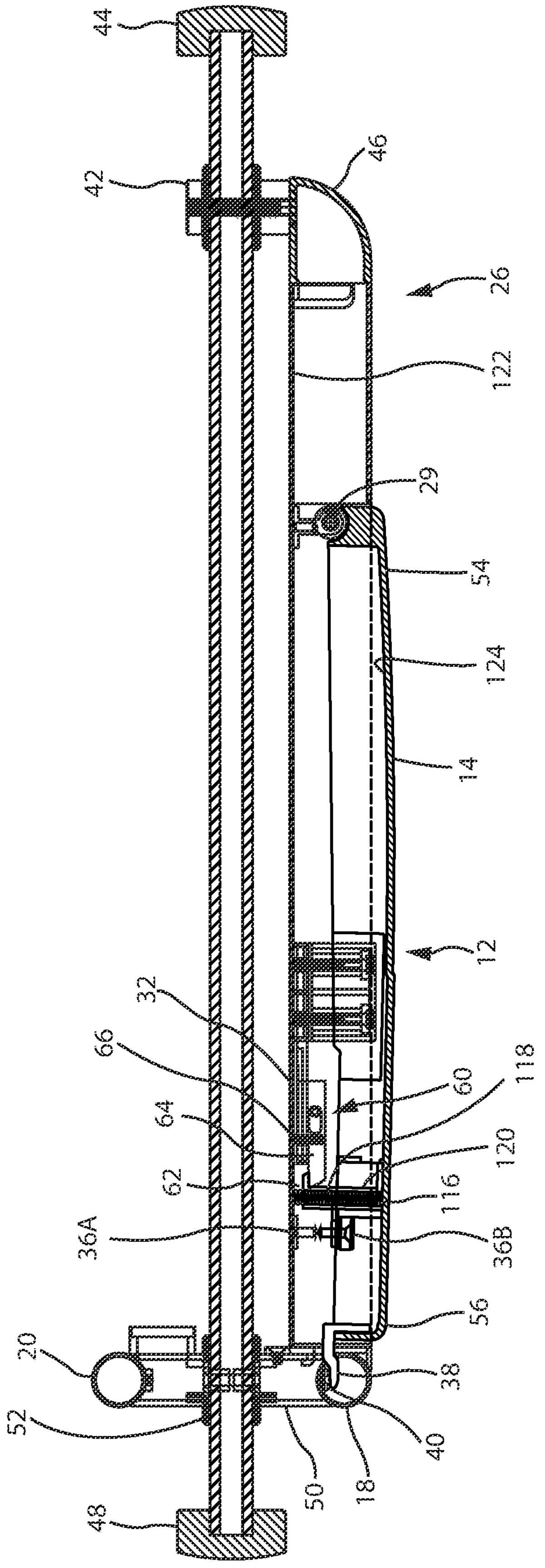
FIG. 4B is a sectional view of the push pad exit device taken along the line 4-4 of FIG. 3, showing the push pad actuator in the unlatched position.

Referring to FIGS. 1-6 and 4A-4B and 6A-6B, in particular, the overall operation of the push pad exit device 10 of the present invention will be described. As shown in FIGS. 2 and 4, the push pad actuator 12 includes a push pad actuator housing 26 and a push pad actuator arm 14. The front face of the actuator arm 14 will typically be engraved or otherwise marked with nomenclature 16, such as the word "PUSH," to make clear where the push pad actuator 12 must be pushed to operate the push pad exit device 10. (See FIG. 2.)

With reference to FIGS. 2, 4A and 4B, the push pad actuator housing 26 is fixed at one end 46 near a pivoting end 44 of the door 28 and at another end 50 near a free or swinging end 48 of the door 28. For purposes of illustration only, a double pane swinging glass door is shown schematically in the figures. The push pad exit device 10 is not limited to use with double pane glass doors but rather may be used with any type of swinging door, i.e. including single pane glass doors and non-glass, i.e. wood or metal, doors. Suitable attachment hardware 42 and 52 for attaching the push pad actuator housing 26 at the pivoting end 44 and free or swinging end 48 of the door 28 is known in art. Such hardware will vary in configuration depending upon the specific type of door construction, i.e. glass, double pane glass, or wood or metal.

With continued reference to FIGS. 4A and 4B, the push pad actuator 12 includes the push pad actuator arm 14. The push pad actuator arm 14 has a pivoting end 54 and a free end 56. The pivoting end 54 is connected to the push pad actuator housing 26 by a pivot 29. The push pad actuator arm 14 is constrained against lateral or side-to-side movement by a guide block 30. Rotational movement of the push pad actuator arm 14 is limited in a direction outward with respect to a plane of the door 28 by a blocking surface 58 located on the push pad actuator housing 26. Rotational movement of the push pad actuator arm 14 inwardly towards the plane of the door is limited by travel stop limiter screws 36A and 36B. The free end 56 of the push pad actuator arm 14 includes a connecting tongue 38 which contacts a motion transfer link 40 contained within the interior vertical door handle 18.

The push pad actuator arm 14 is biased in an outward or door locked position by a biasing spring 116 which at one end is inserted in a bore 120 in a catch fitting 34 wherein the spring end bears against a wall surface 124 of the push pad actuator arm 14. Another end of the biasing spring 116 is inserted into a plunger 118, wherein the plunger 118 resides partially within the bore 120 of the catch fitting 34. The plunger 118 bears against a wall surface 122 of the push pad actuator housing 26.

FIG. 4A shows the push pad actuator 12 in a first or latched position. In this position, the push pad actuator 12 is biased, by the motion transfer link 40 and the biasing spring 116, such that the connecting tongue 38 is in contact with the blocking surface 58 located on the push pad actuator housing 26. FIG. 4B shows the push pad actuator 12 in a second or unlatched position. In this position, the actuator 12 is biased, by a user pushing on the push pad actuator arm 14, such that the travel limiting screws 36A and 36B are in contact.

The push pad actuator 12 may optionally be equipped with a manual catch or dogging assembly 60 which comprises a catch fitting 34 having a catch 62 and a slide assembly 32 having a slide member 64 and a finger extension 66 attached to the slide member 64. The manual catch 60 allows a user to lock the door 28 in an unlatched position which thereby allows door to swing freely and the push pad actuator 12 to be used as an interior door handle. The manual catch 60 is simple to operate. A user need only depress the push pad actuator arm 14 until it contacts the travel limit screws 36A and 36B, i.e. until it stops moving, and slide the slide member 64 towards the free end 48 of the door 28 until movement stops. At this point, the slide member 64 will have engaged the catch 62 and the door 28 will be held in an unlatched position. The manual catch 60 is shown in the engaged position in FIG. 4B and in the disengaged position in FIG. 4A.

Figure 5:
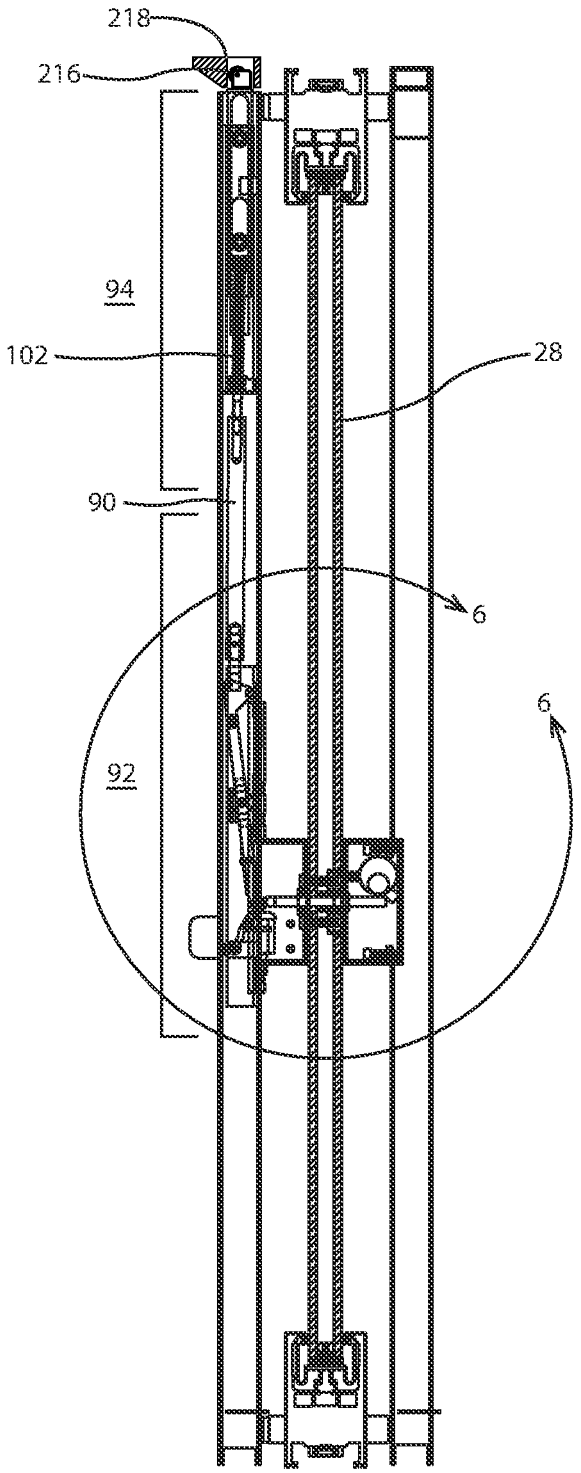
FIG. 5 is a left end view of the glass door of FIG. 1.
Figure 6A:
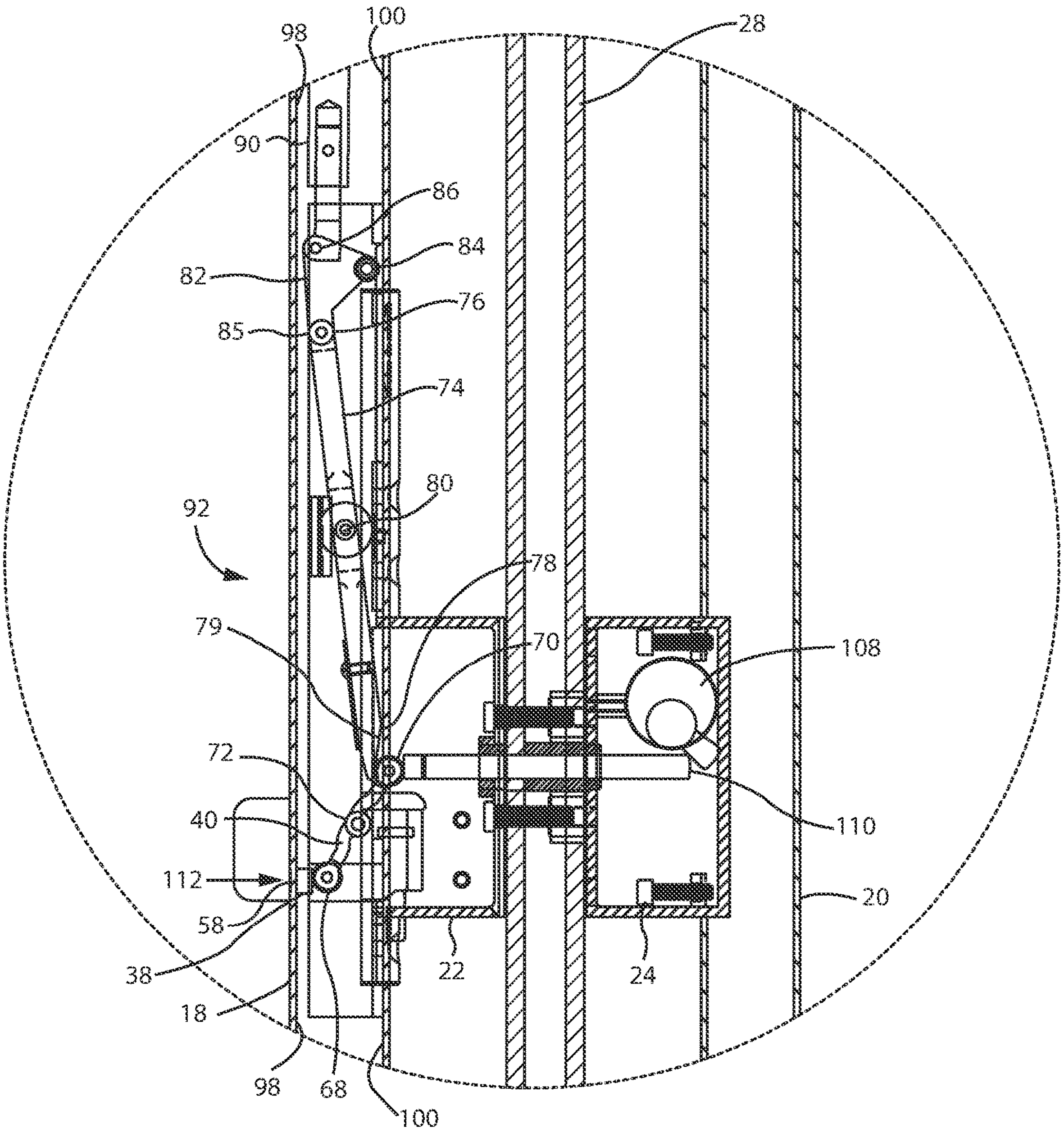
FIG. 6A is an enlarged detail sectional view of a portion of FIG. 5, as shown by circle 6-6 of FIG. 5, showing the latching mechanism in the latched position.
Figure 6B:
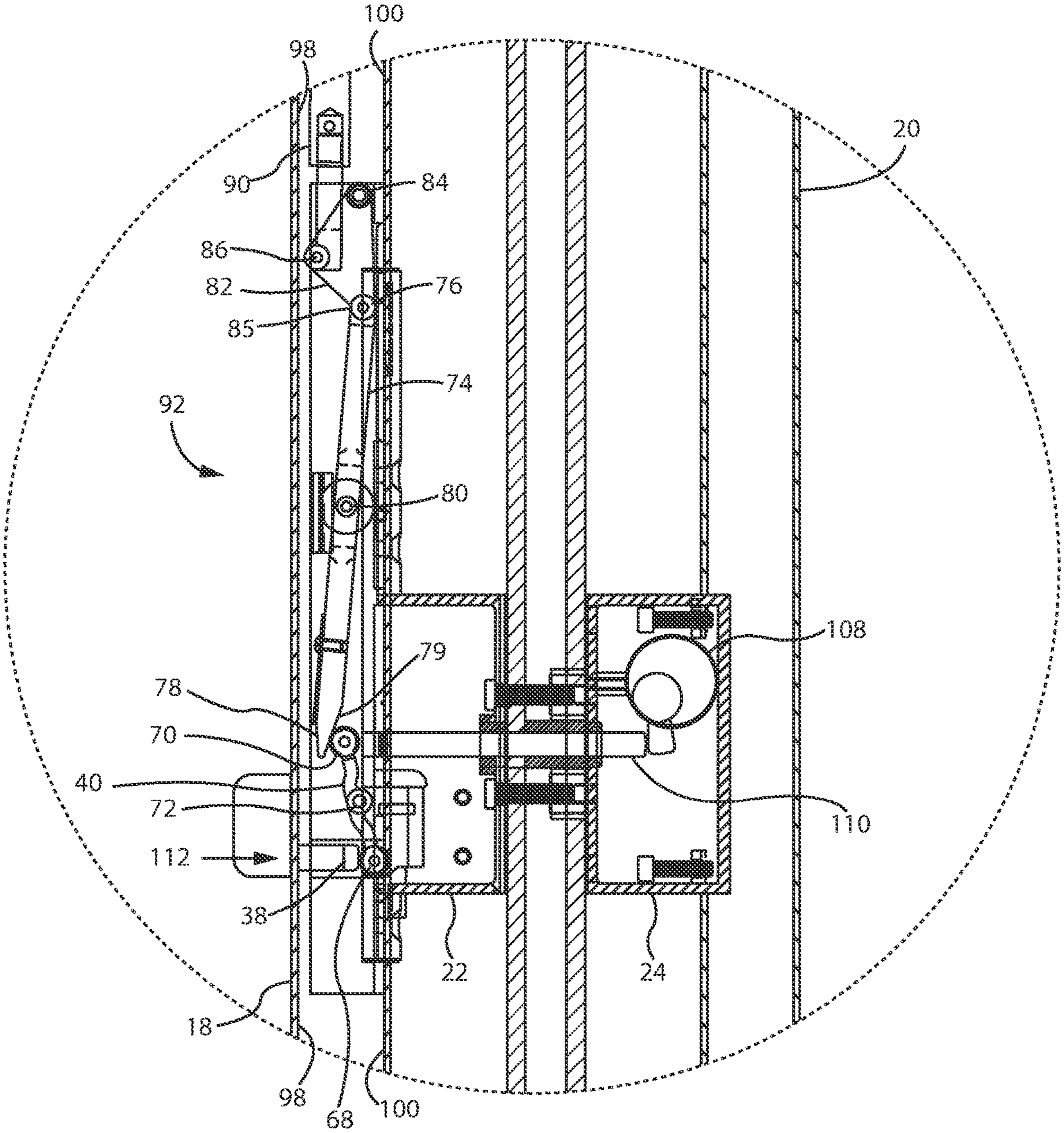
FIG. 6B is an enlarged detail sectional view of FIG. 5, as shown by circle 6-6 of FIG. 5, showing the latching mechanism in the unlatched position.

Referring now to FIGS. 5, 6A and 6B, enclosed within the interior vertical door handle 18 are a latching mechanism 92 and a representative latch bolt assembly 94. (See FIG. 5). The latching mechanism 92 and latch bolt assembly 94 are operable between a first latched position and a second unlatched position. Suitable latch bolt assemblies for use in the present invention are known in the art and are commercially available. (Blumcraft Part No. MPHTOP, is one such suitable latch bolt assembly.)

As shown in FIG. 5, the representative latch bolt assembly 94 includes a biasing spring 102 that biases an improved roller latch bolt 216 upwardly into a latching recess or strike plate 218 in a door frame (i.e. a first latched position) and is configured such that an upwardly directed biasing force is applied to a series of links, i.e. the motion transfer link 40, a lever arm 74, and an over-center link 82 which comprise the latching mechanism 92, as well as a connecting rod 90 which interconnects the latching mechanism 92 with the latch bolt assembly 94 (see FIGS. 6A and 6B).

The upwardly directed biasing force applied by biasing spring 102 biases the latch bolt assembly 94 and its associated components, i.e. motion transfer link 40, lever arm 74 and over-center link 82, into the first latched position, as shown in FIG. 6A. The operation of the latching mechanism 92 of the present invention will be described hereinafter.

As shown in FIG. 5, the improved roller latch bolt 216 engages the latching recess or strike plate 218 which secures the door 28 in the latched position. With reference to FIGS. 6A and 6B, the door is unlatched when a force 112 is applied to the push pad actuator arm 14 which overcomes the biasing force applied by biasing spring 102 of the latch bolt assembly 94 and which causes the connecting tongue 38 to depress inwardly a lower link end 68 of the motion transfer link 40 which initiates a sequence of events which causes the lever arm 74, over-center link 82 and connecting rod 90 to withdraw the improved roller latch bolt 216 from the strike plate 218 and allow the door 28 to swing freely.

With reference to FIGS. 6A and 6B, an inwardly directed force 112 (from pushing on the push pad actuator arm 14) overcomes the biasing force applied by biasing spring 102 and causes the connecting tongue 38 to depress or push the lower link end 68 from a first latched position on interior wall surface 98 (see FIG. 6A) of the interior vertical door handle 18 to a second unlatched position an opposite interior wall surface 100 (see FIG. 6B) of the interior vertical door handle 18. This causes motion transfer link 40 to pivot about pivot point 72 such that upper link end 70 of the motion transfer link 40 moves from its first latched position at interior wall surface 100 (see FIG. 6A) to a second unlatched position on opposite interior wall surface 98 (see FIG. 6B). This in turn causes upper link end 70 of the motion transfer link 40 to press upon lower link end 78 of the lever arm 74 and causes the lever arm 74 to move from its first latched position on interior wall surface 100 (see FIG. 6A) to a second unlatched position on opposite interior wall surface 98 (see FIG. 6B).

It should be noted that the function of the motion transfer link 40 is to convert horizontal motion from the push pad actuator arm 14 via connecting tongue 38 into vertical motion in the latching mechanism 92.

In moving from its first latched position to its second unlatched position, motion transfer link 40 causes lever arm 74 to pivot about pivot point 80 and therein causes upper link end 76 to move from its first unlatched position on interior wall surface 98 (see FIG. 6A) to a second latched position on opposite interior wall surface 100. This motion causes the over-center link 82 to change position from its first latched position (see FIG. 6A) to a second unlatched position as shown in FIG. 6B. This in turn causes connecting rod 90 to be pulled downwardly which pulls the bolt assembly 94 downwardly causing the improved latch bolt 216 to be withdrawn from the latching recess or strike plate 218 (see FIG. 5), i.e. to a second unlatched position, thereby unlatching the door 28. Once unlatched, if desired, the latching mechanism 92 (and push pad actuator arm 14) may be retained in the unlatched position by actuation of the manual catch assembly or dogging mechanism 60, as described above.

Lower and upper link ends 68 and 70 of the motion transfer link 40 will typically be equipped with rollers. Lower link end 78 of lever arm 74 is configured as an angled surface or wedging surface 79. Upper link end 70 of motion transfer link 40 will typically roll against the angled surface 79, when moving from its first latched position to its second unlatched position. Upper link end 70 may also be configured to slide against the angled surface 79. Similarly, connection point 84 of over-center link 82, will typically be equipped with a roller. When moving from its first latched position to its second unlatched position, connection point 84 will roll upwardly along the interior wall surface 100 of the interior vertical door handle 18 and will roll downwardly along the interior wall surface 100 when returning to its first latched position. Connection point 84 may also be configured to slide against interior wall surface 100.

Upon the removal of pushing force 112 (inwardly directed force) from the push pad actuator arm 14, upwardly directed biasing force applied by the biasing spring 102 of bolt assembly 94 causes the lever arm 74 to rotate (or flip) from its unlatched position (see FIG. 6B) back to its latched position (see FIG. 6A). Upper link end 76 of lever arm 74 and connection point 85 of over-center link 82, will typically be connected via a common roller. Connection point 84 of the over center-link 82 will typically be equipped with a roller. The connection at connection point 86 between the over-center link 82 and connecting rod 90 will typically be a pinned connection. Mechanism Release, i.e. removal of actuation force 112 from the push pad actuator arm 14 will cause the latching mechanism 92 and bolt assembly 94 to return to their latched positions due to the upwardly directed force exerted by biasing spring 102 which pulls the connecting rod 90, over-center link 82, lever arm 74, and motion transfer link 40 to their first latched positions.

With continued reference to FIGS. 6A and 6B, the push pad exit device of the present invention may also be equipped with an optional lock 108, illustrated schematically, that allows a user to open the door 28 from the outside with the door in its latched or locked position. In such an installation, the push pad exit device 10 will typically be equipped with the centrally located interior and exterior housings 22 and 24, respectively. Located within the centrally located exterior housing 24 is an exterior lock 108 which in a preferred embodiment is a keyed lock. However, the lock may also be a key pad or magnetic card style lock. The lock is configured to operate a push rod 110 which bears against upper link end of the motion transfer link 40. When the push pad exit device 10 is in the latched or locked position, actuation of the exterior lock 108 causes the push rod 110 to push upper link end 70 from its first latched position on wall surface 100 (see FIG. 6A) to its second unlatched position on the interior wall surface 98 (see FIG. 6B) and therein sets in motion the sequence of events described above that unlatches or unlocks the door.

Push Pad Actuator Arm—Alternative Embodiment

Figure 7A:
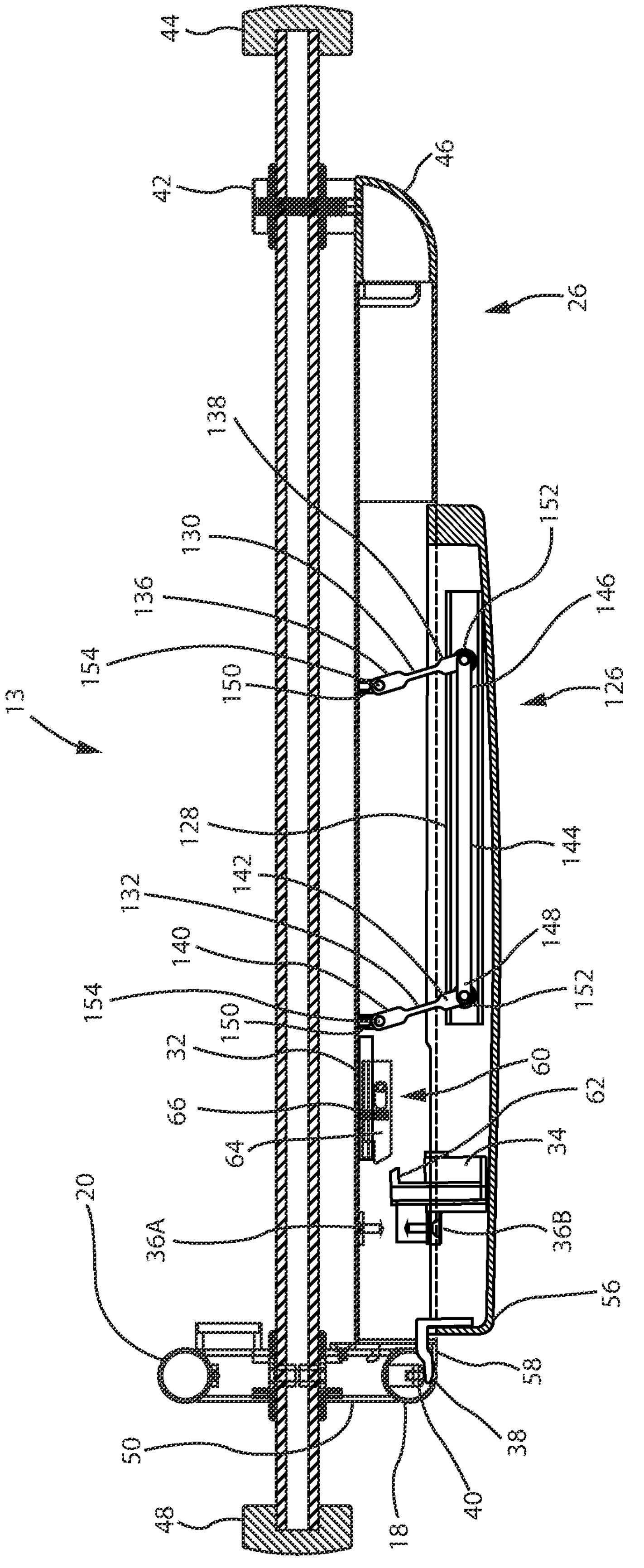
FIG. 7A is a sectional view of the push pad exit device taken along the line 4-4 of FIG. 3, showing an alternative embodiment of the push pad actuator in the latched position.
Figure 7B:
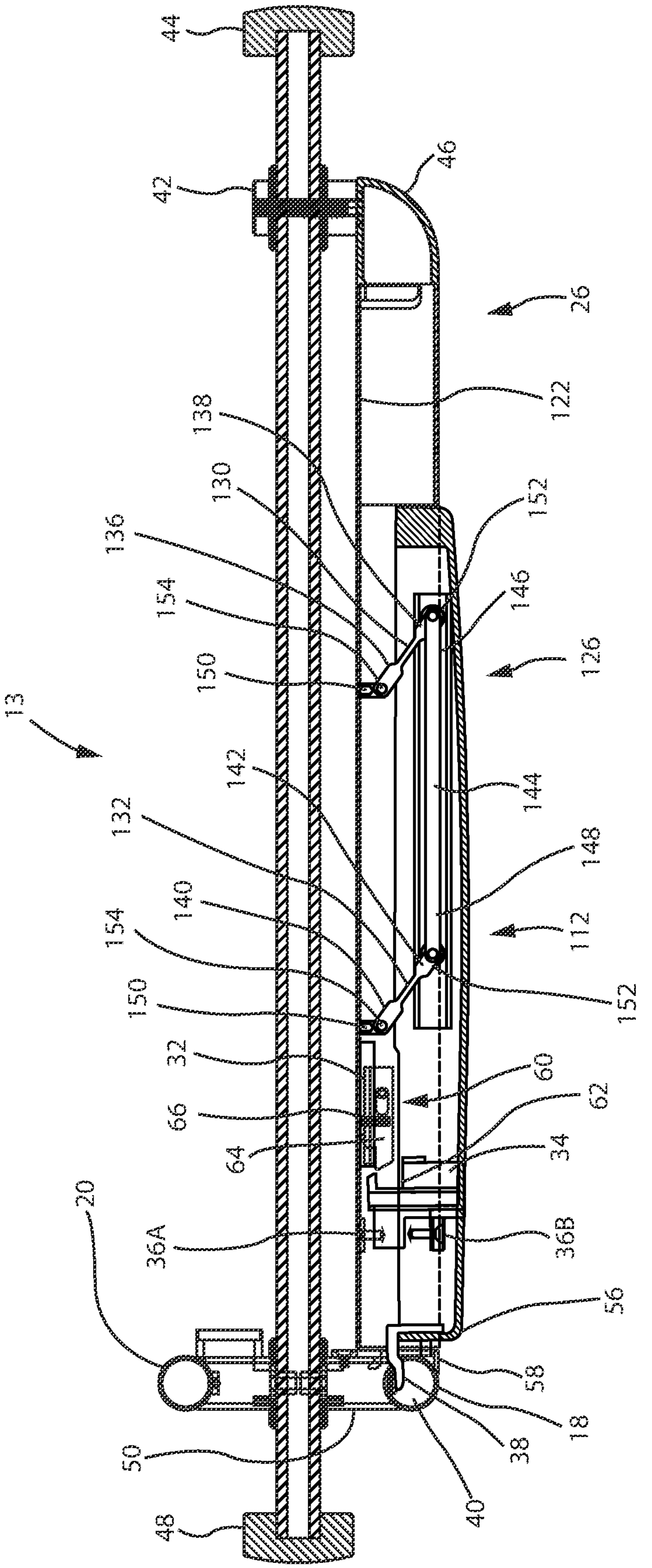
FIG. 7B is a sectional view of the push pad exit device taken along the line 4-4 of FIG. 3, showing an alternative embodiment of the push pad actuator in the unlatched position

Referring now to FIGS. 7A and 7B, an alternative embodiment of the push pad actuator 13 is shown. FIG. 7A shows the alternative embodiment of the push pad actuator 13 in a first or door locked position. FIG. 7B shows the alternative embodiment of the push pad actuator 13 in a second or door unlocked position. The alternative embodiment of the push pad actuator 13 is similar to that of FIGS. 4A and 4B with the exception that a parallel linkage assembly 126 is used to actuate the push pad actuator arm 14, whereas in the embodiment shown in FIGS. 4A and 4B, the push pad actuator arm 14 pivoted about pivot 29 on the push pad actuator housing 26.

As in the pivoting embodiment of FIGS. 4A and 4B, in the parallel linkage embodiment of FIGS. 7A and 7B, the alternative embodiment of the push pad actuator 13 includes a push pad actuator housing 26 and a push pad actuator arm 14. The front face of the push pad actuator arm 14 will typically be engraved or otherwise marked with nomenclature 16, such as the word "PUSH," to make clear where the push pad actuator arm 14 should be pushed to most effectively operate the push pad exit device 10. (See FIG. 2.)

With reference to FIGS. 2, 7A and 7B, the push pad actuator housing 26 is fixed at one end 46 near the pivoting end 44 of the door 28 and at another end near the free or swinging end 48 of the door 28. For illustrative purposes only, a double pane swinging glass door is shown schematically in the figures. Suitable attachment hardware 42 and 52 for attaching the push pad actuator housing 26 at the pivoting end 44 and free or swinging end 48 of the door 28 are known in art. Such hardware will vary in configuration depending upon the specific type of door construction, i.e. glass, double pane glass, or wood or metal.

With continued reference to FIGS. 7A and 7B, the push pad actuator arm 14 is attached to the push pad actuator housing 26 by means of the parallel linkage assembly 126. The parallel linkage assembly 126 includes a linear guide track 128, which is fixed to the push pad actuator arm 14; a first parallel link 130 having a first link end 136 and a second link end 138; a second parallel link 132, having a first link end 140 and second link end 142; and, a connecting rod 144. The first link ends 136 and 140 of the first and second parallel links 130 and 132 are fixed to the push pad actuator housing by means of pivot connections 150, where the pivot connections 150 each include a torsion spring 154 which serve to bias the parallel linkage assembly 126 to an outward or door locked position.

The upper link end 138 of the first parallel link 130 is pivotally connected to an end 146 of the connecting rod 144 and the upper link end 142 of the second parallel link 132 is connected to another end 148 of the connecting rod 144. Each link end to connecting rod connection includes a roller 152, i.e. the connection between upper link end 138 and connecting rod end 146 includes a roller 152 and the connection between upper link end 142 and connecting rod end 148 also includes a roller 152.

FIG. 7A, shows the push pad actuator arm 14 in its first or locked position. Upon the application of force by a user on the push pad actuator arm 14, i.e. application force 112, the biasing force exerted by the torsion springs 154 is overcome and the push pad actuator arm 14 moves inwardly to its second or unlocked position and causes the connecting tongue 38 to depress inwardly the lower link end 68 of the motion transfer link 40 and therein actuates the latching mechanism 92 and unlocks the door 28, as described in reference to FIGS. 5, 6A and 6B.

With continued reference to FIGS. 7A and 7B, in more detail the application of an actuating force 112 to the push pad actuator arm 14 causes the parallel links 130 and 132 to rotate downwardly moving from their first or locked position to their second or unlocked position. The connecting rod 144 likewise moves downwardly from a first or locked position to a second or unlocked position, while rolling via the rollers 152 towards the pivoting end 44 of the door 28 in the linear guide track 128. Because the linear guide track 128 is fixed to the push pad actuator arm 14 and the parallel links 130 and 132 are fixed at link ends 136 and 140 to the push pad actuator housing 26, which is fixed to the door 28, the parallel linkage assembly 126 suspends the push pad actuator arm 14 from the push pad actuator housing 26 and allows it to move between its first or locked position to its second or unlocked position.

It should be noted that because of the action of the parallel linkage assembly 126, the push pad actuator arm moves linearly inwardly towards the surface of the door 28. The push pad actuator arm 14 does not pivot (as in, for example, the embodiment disclosed in FIGS. 4A and 4B) and nor does it move laterally with respect to the push pad actuator housing 26. The alternative embodiment of the push pad actuator 12 described in FIGS. 7A and 7B provides a distinctly different "feel" from that of the embodiment described in FIGS. 4A and 4B, which may be preferred by in some installations.

Like the embodiment of the push pad actuator 12 depicted in FIGS. 4A and 4B, the alternative embodiment of the push pad actuator 13 depicted in FIGS. 7A and 7B may optionally be equipped with the manual catch or dogging assembly 60 which comprises the catch fitting 34 including the catch 62 and the slide assembly 32 including the slide member 64 and the finger extension 66 attached to the slide member 64. In both embodiments of the push pad actuator, the manual catch 60 allows a user to lock the door 28 in an unlatched position which thereby allows door to swing freely and the push pad actuator to be used as an interior door handle. The manual catch 60 is shown in the engaged position in FIG. 7B and in the disengaged position in FIG. 7A.

Likewise, in the alternative embodiment of the push pad actuator 13, the motion of the push pad actuator arm 14 may also be limited by the travel limit screws 36A and 36B.

Improved Roller Latch Bolt

With reference to FIGS. 1 and 5, the representative glass door 28 having mounted thereon the push pad exit device 10 and latching mechanism 92 of the present invention and a representative latch bolt assembly 94 containing the improved roller latch bolt 216 of the present invention are shown.

Figure 8A:
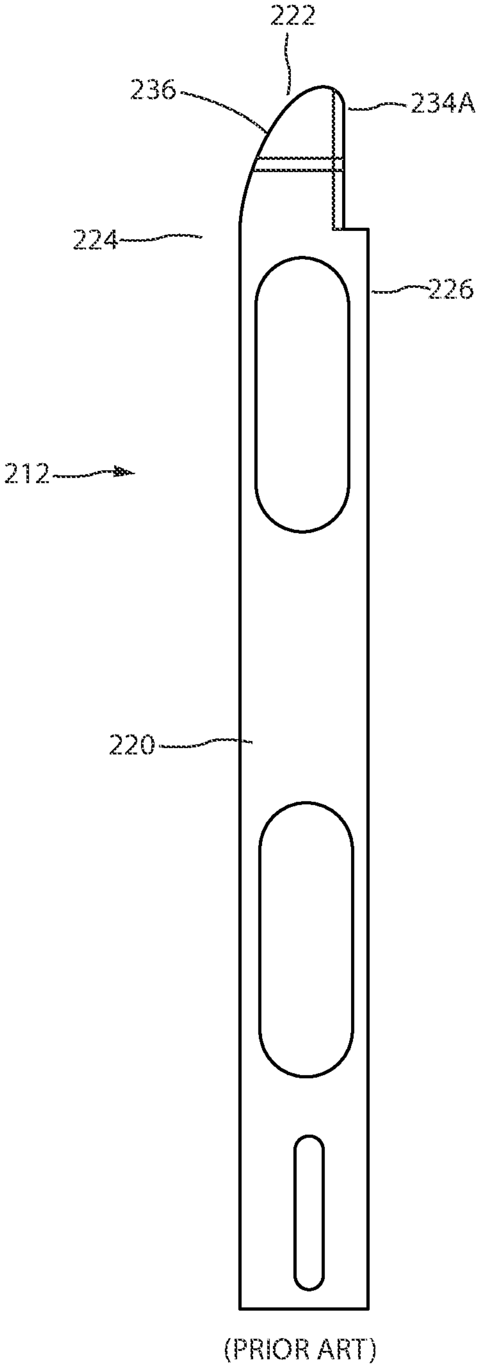
FIG. 8A is a side view of a prior art non-roller latch bolt.
Figure 8B:
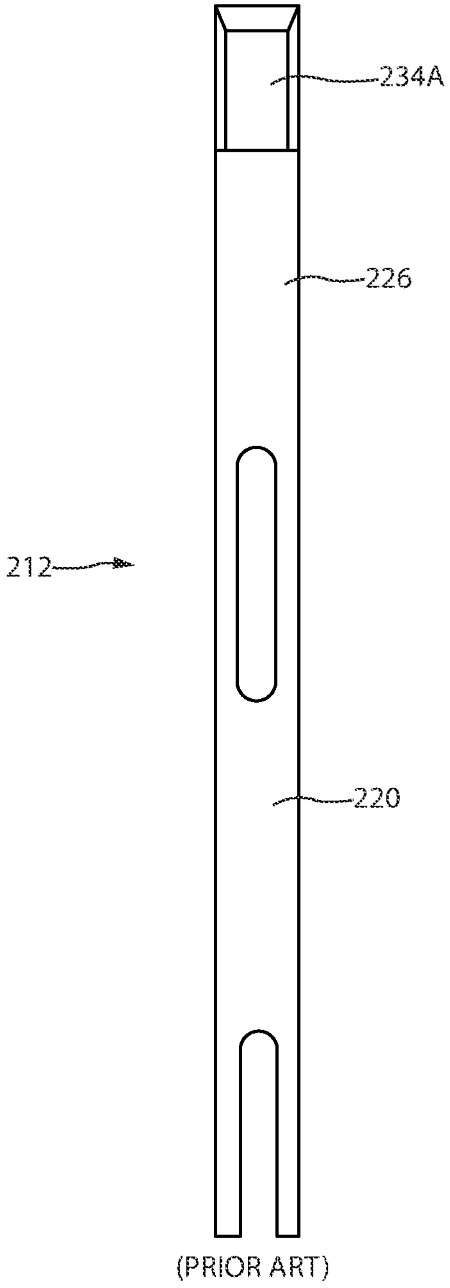
FIG. 8B is a front view of the prior art non-roller latch bolt of FIG. 8A.
Figure 9A:
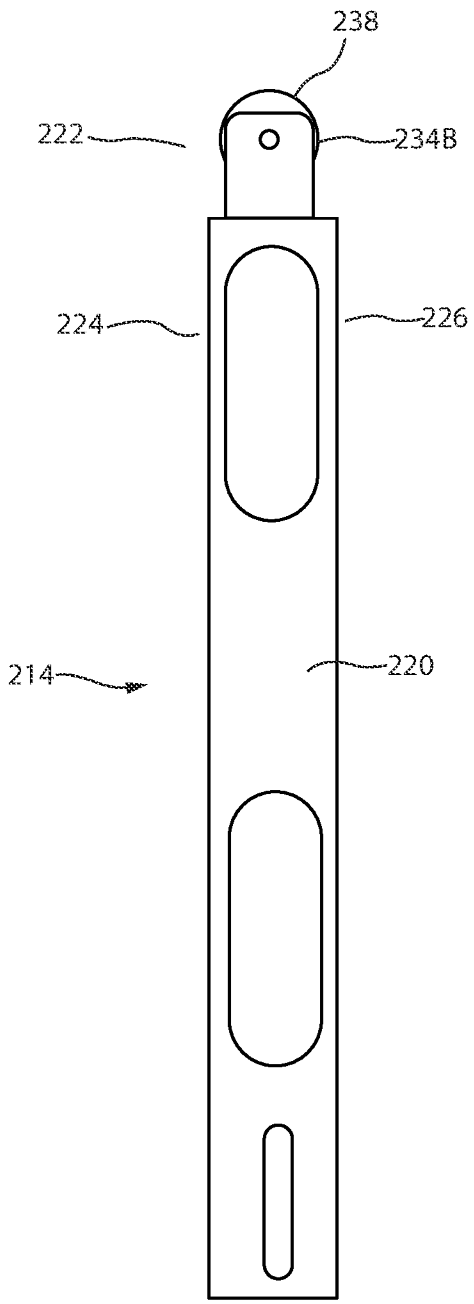
(PRIOR ART) Fig. 9A
FIG. 9A is a side view of a prior art roller latch bolt.
Figure 9B:
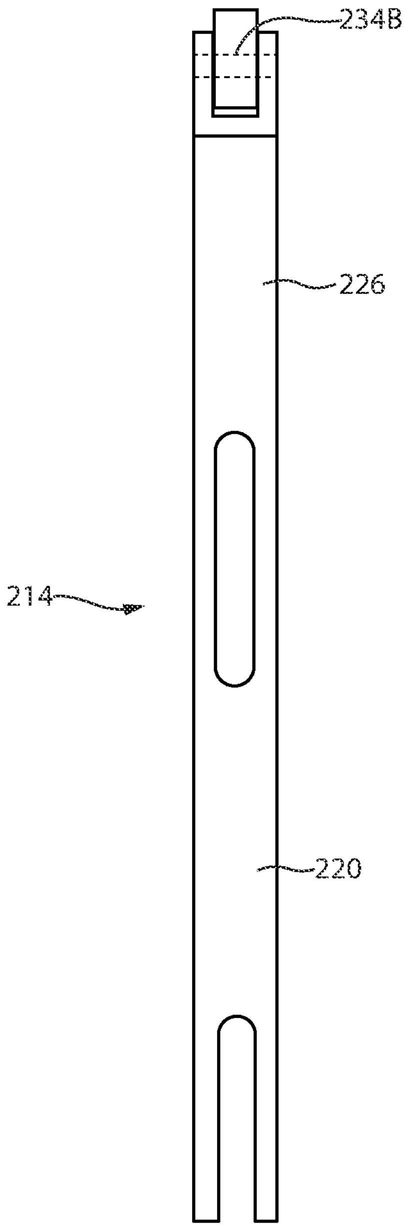
(PRIOR ART) Fig. 9B
FIG. 9B is a front view of the prior art roller latch bolt of FIG. 9A.
Figure 10A:
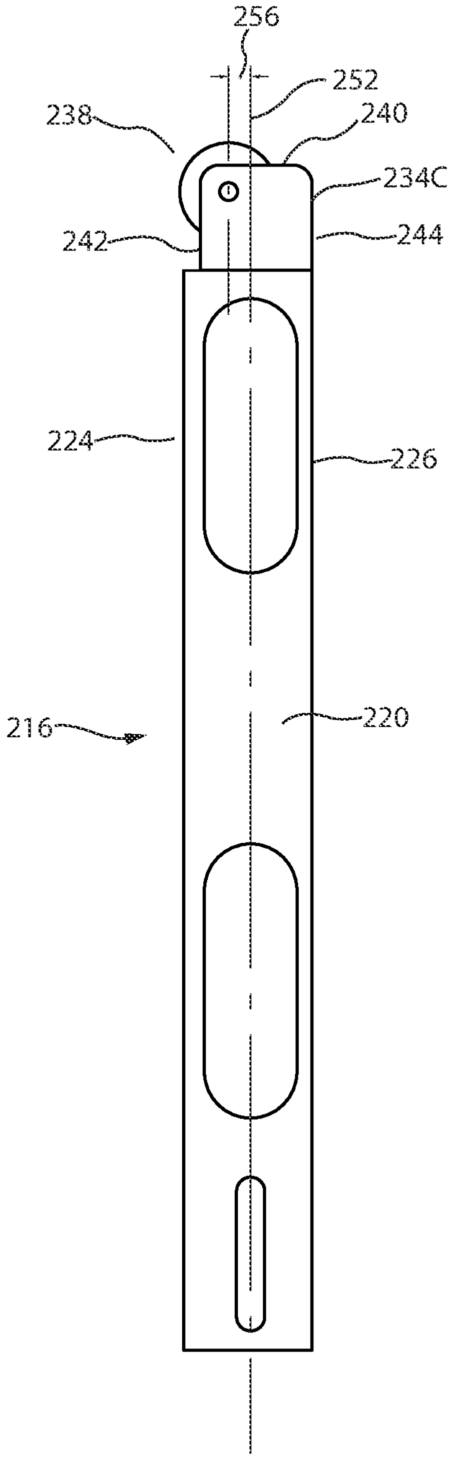
FIG. 10A is a side view of the improved roller latch bolt of the present invention.
Figure 10B:
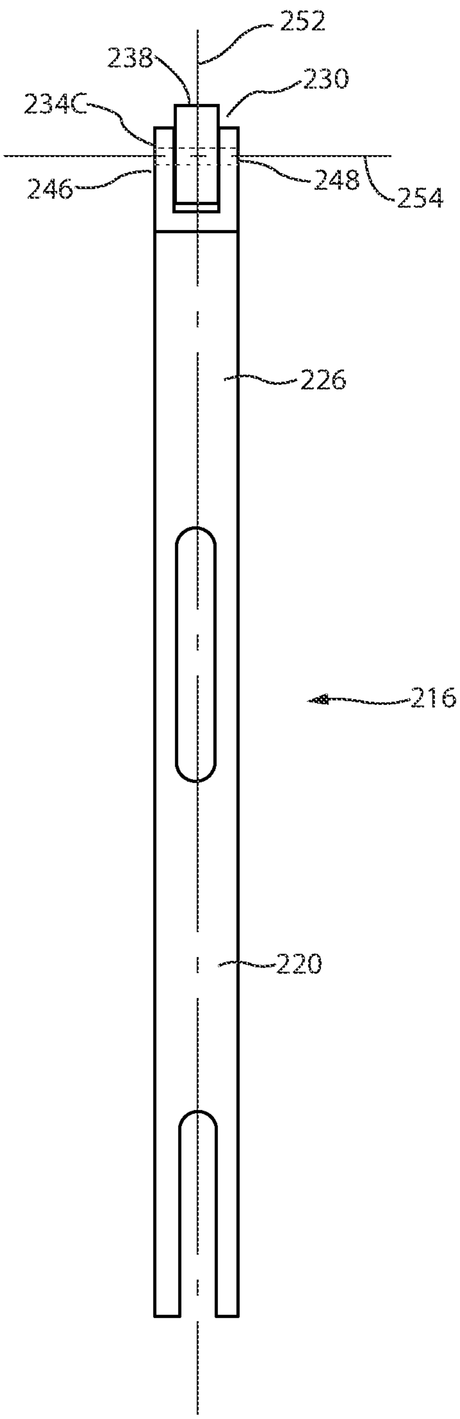
FIG. 10B is a front view of the improved roller latch bolt of FIG. 10A.
Figure 10C:
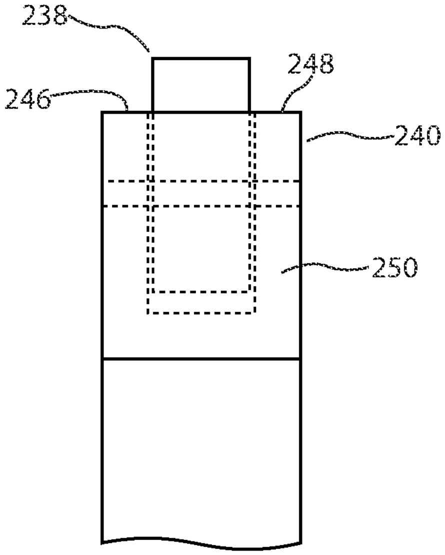
FIG. 10C is a top view of an alternative embodiment of the improved roller latch bolt of the present invention.
Figure 10D:
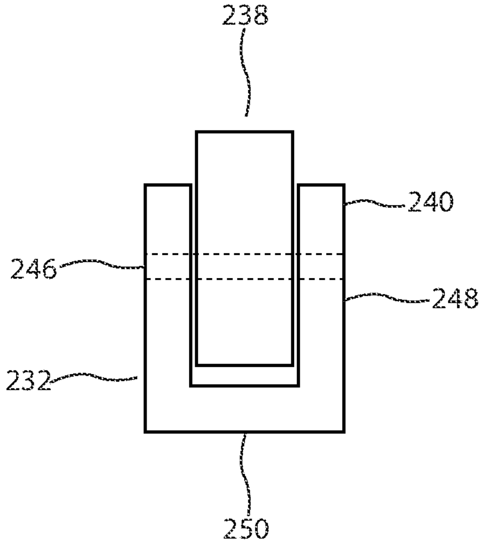
FIG. 10D is a top view of the alternative embodiment of the improved roller latch bolt of FIG. 10C.

FIGS. 8A-8B show a schematic representation of a prior art non-roller latch bolt 212. FIGS. 9A-9B show a schematic representation of a prior art roller latch bolt 214 and FIGS. 10A to 10B show a schematic representation of the improved roller latch bolt 216 of the present invention. Actual physical implementations of the prior art latch bolts will vary depending upon the manufacturer and specific application.

Figure 11A:
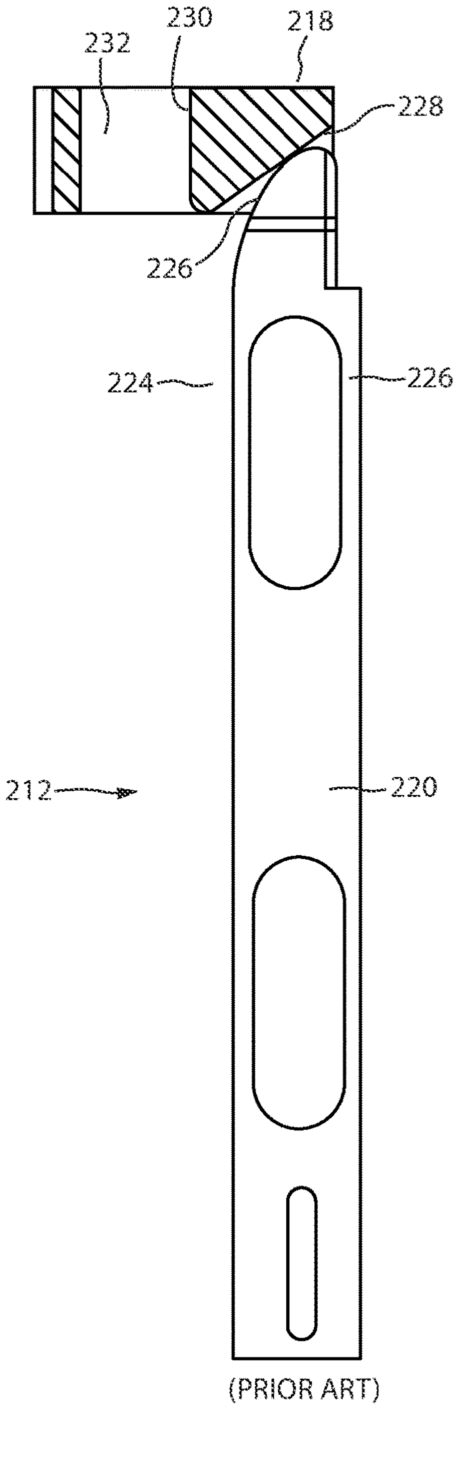
(PRIOR ART) Fig. 11A
FIG. 11A is a side view of a prior art non-roller latch bolt engaging a ramp of a strike plate.
Figure 11B:
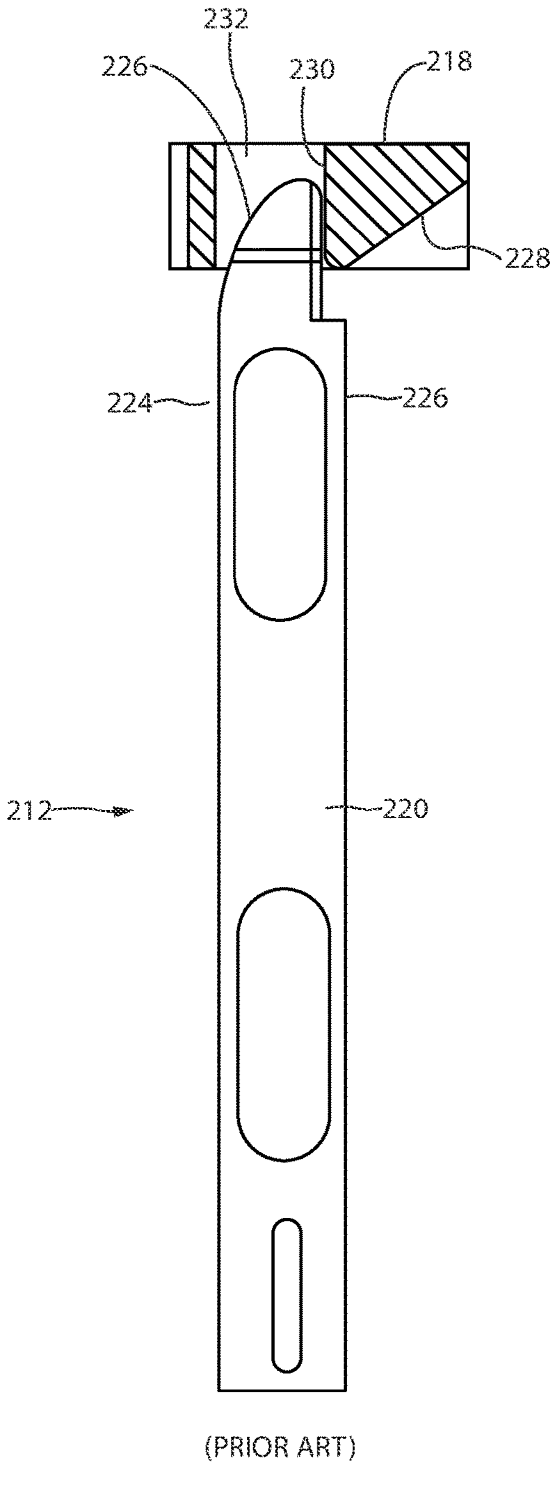
(PRIOR ART) Fig. 11B
FIG. 11B is a side view of the prior art non-roller latch bolt of FIG. 11A seated in the socket of a strike plate.
Figure 12A:
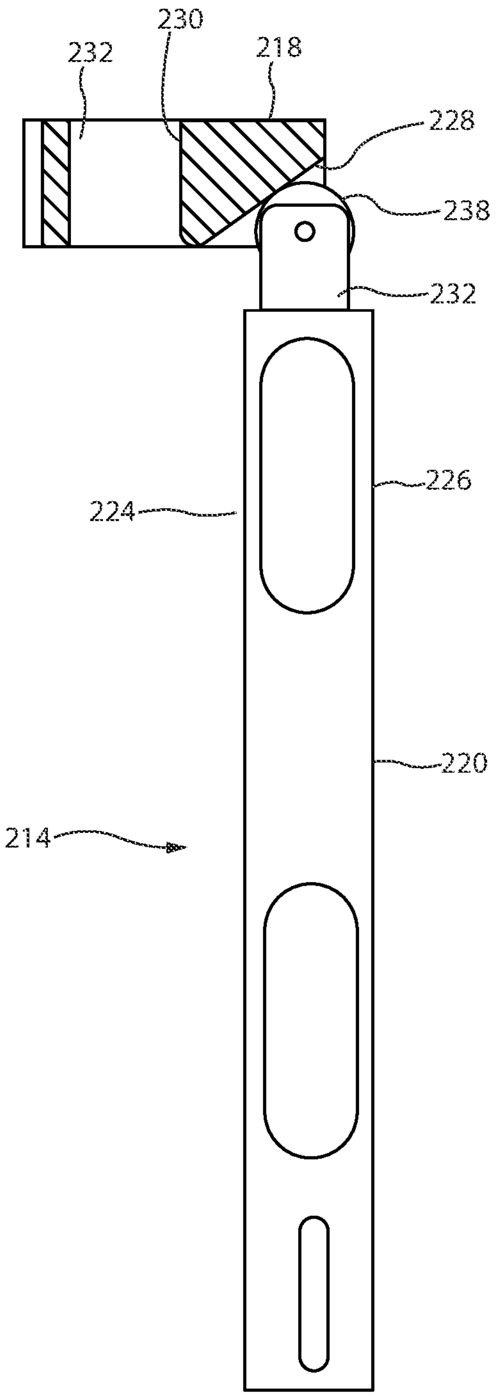
(PRIOR ART) Fig. 12A
FIG. 12A is a side view of a prior art roller latch bolt engaging a ramp of a strike plate.
Figure 12B:
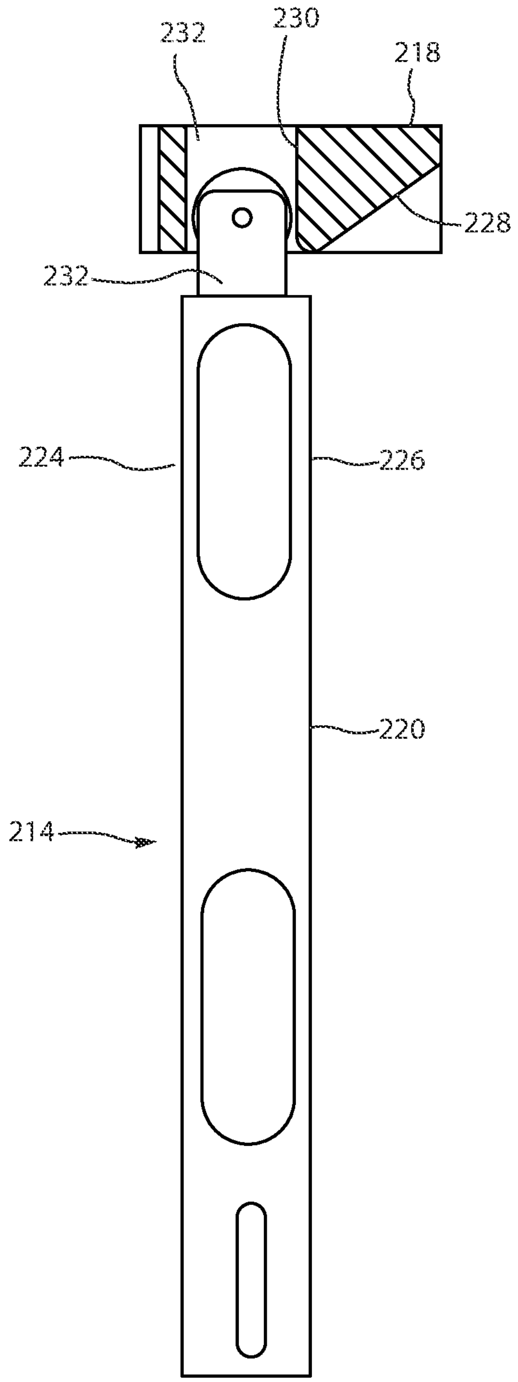
(PRIOR ART) Fig. 12B
FIG. 12B is a side view of the prior art roller latch bolt of FIG. 12A seated in the socket of a strike plate.
Figure 13A:
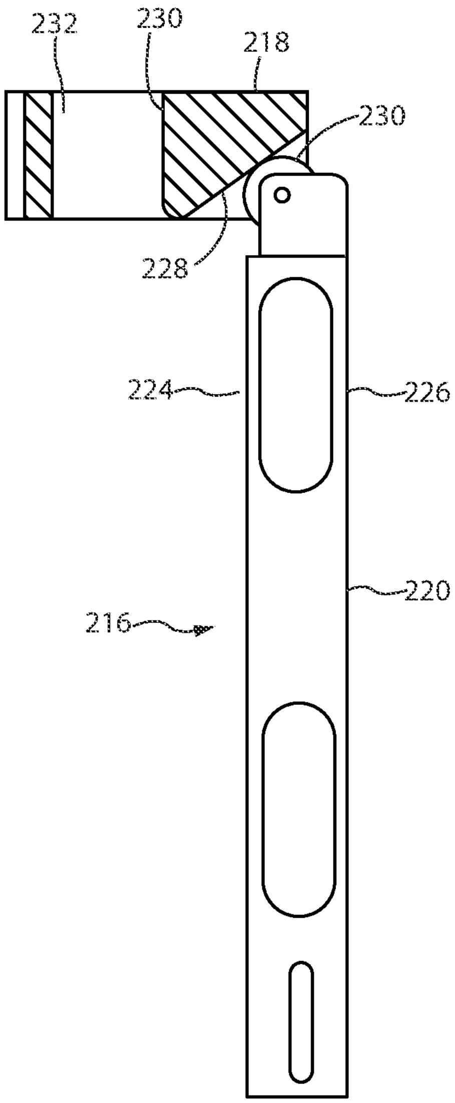
FIG. 13A is the improved roller latch bolt of the present invention engaging a ramp of a strike plate.

With reference to FIGS. 8A to 10B, as shown schematically, the prior art non-roller latch bolt 212 and prior art roller latch bolt 214 and the improved roller latch bolt 216 of the present invention have, generally, the following features in common. Each latch bolt has a body portion 220, a head portion 222, a sweep side 224 and a latch side 226. The sweep side 224 of each latch bolt corresponds to the side of the latch bolt that engages a ramp 228 of a strike plate 218. (See FIGS. 11A, 12A and 13A.) The latch side 226 of each latch bolt corresponds to the side of the bolt that engages a latch surface 230 of the strike plate 218.

The body portion 220 of a latch bolt is engageable, typically, via a vertical rod, with a latch bolt release mechanism 210 that is configured to move the latch bolt towards or away from the corresponding strike plate 218. Latch bolt release mechanisms will also typically have an adjustment feature that allows the depth of engagement of the latch bolt with its corresponding strike plate to be adjusted. Such latch release mechanisms are disclosed in U.S. Pat. Nos. 4,366,974; 4,382,620; 4,418,949; 4,506,922; 6,511,104 and 6,726,257.

Latch bolts, as installed in a representative latch bolt release mechanism 210, are also typically spring loaded. Thus, as a door equipped with a vertical latch bolt closes, the spring-loaded latch bolt rides along the ramp 228 of the strike plate 218 and is depressed into the latch bolt release mechanism 210. As the latch bolt transitions from the ramp 228 into a socket 232 of the strike plate 218, the biasing springs of the latch bolt release mechanism bias the latch bolt upwardly into the socket 232 of the strike plate 218. Therefore, the effort and smoothness of operation of a door equipped with a vertical door latch assembly is dependent upon the interface between the sweep side 224 of the latch bolt and the ramp 228 of the strike plate 218. Generally, rolling action will generate less friction and, therefore, produce a smoother operation than sliding action and require less force to close.

With reference to FIGS. 8A to 13A, the security of the connection between a latch bolt and the strike plate 218, depends upon the interface between a contact surface on the latch side 226 of the latch bolt and the latch surface 230 of the strike plate 218. The latch surface 230 of the strike plate 218 will typically be a flat vertical surface.

In the prior art roller latch bolt 214, line contact only exists between the contact surface 234B and the latch surface 230 of the strike plate 218. That is, the contact surface 234B between the prior art latch bolt 214 and the latch surface 230 is effectively minimized to a line, i.e., the line of points along the width of the circular roller that are tangent to the plane occupied by the latch surface 230. This minimization of the contact area offers less tolerance when installing and adjusting the latch bolt because the closer the line of contact between the prior art latch bolt 214 and the latch surface 230 to the lower boundary of the socket 232, the more vulnerable the door may be to "forced entry," which, as used herein, refers to any force attempting to open the door without first releasing the latch.

While less friction, less force, and smoothness are desirable when closing the door, they are not desirable attributes when seeking to secure the door opening. A minimal contact area not only provides less tolerance when installing and adjusting the latch bolt, but it also focuses all of the force generated from forced entry into a concentrated area instead of spreading it out over a larger surface. This concentration of force onto a smaller area makes the latch release mechanism more susceptible to damage and possible failure. Therefore, latch bolt designs that maximize the contact area between the latch face of the latch bolt and the latch surface of the strike plate may have an advantage in that they provide more tolerance in installing and adjusting the latch, more force may be required to force entry through the door or otherwise open it without first releasing the latch, and such force, being spread out offer a larger area, is less of a threat to the structural integrity of the latch assembly.

With reference to FIGS. 8A-8B and 11A-11B, in prior art non-roller latch bolts 212, the sweep side 224 of the head portion 222 is typically equipped with an angled face or curved face. In the prior art non-roller latch bolt 212 of FIG. 8A, the sweep side 224 of the head portion 222 is configured as a curved surface 236. The curved surface 236 slides along the length of the ramp 228 of the strike plate 218. Although efforts may be made to minimize friction between the two surfaces, sliding motion is inherently not as smooth as rolling motion and a door equipped with a non-roller latch bar requires more effort to close than a door with a roller latch bar. Also, as the two sliding surfaces wear over time, friction between the surfaces increases and consequently, door closing effort increases and smoothness of operation decreases over time in non-roller latch bar equipped doors.

An advantage however, of a non-roller latch bolt, such as prior art non-roller latch bolt 212 shown in FIGS. 8A-8B and 11A-11B is that such latch bolts have a contact surface 234A that is a flat face. The flat face contact surface 234A abuts the equally flat latch surface 230 of the strike plate 218 which creates a connection that, due to having a large contact area between the abutting surfaces, is resistant to attempts at forced entry.

With reference to FIGS. 9A-9B and 12A-12B, in the prior art roller latch bolt 214, the head portion 222 comprises a roller 238, instead of a curved surface. Thus, the sweep side 224 and the latch side 226 of the prior art roller latch bolt 214 present a cylindrical contact surface to the ramp 228 and latch surface 230 of the strike plate 218. The prior art roller latch bolt 214 has certain advantages and disadvantages in comparison to the prior art non-roller latch bolt 212.

In particular, with the prior art roller latch bolt 214, the roller 238 engages the ramp 228 of the strike plate 218. Due to rolling engagement of these two surfaces, door operation with the prior art roller latch bolt 214 is smoother and requires less effort than that of a door equipped with the non-roller latch bolt 212. On the other hand, when the prior art roller latch bolt 214 is seated within the socket 232 of the strike plate 218, there is, as previously indicated, only line contact between the roller 238 and the latch surface 230. Because only line contact exists at this interface and because there is some flexibility inherent in a door and door frame, doors equipped with prior art roller latch bolts may be less secure, i.e., may more easily be forced open, or subject to forced entry, than doors equipped with non-roller latch bolts. As previously indicated, they may also be more susceptible to damage or failure and offer less tolerance in installation and adjustment.

With reference to FIGS. 10A-10B and 13A-13B, the improved roller latch bolt 216 of the present invention combines the advantages of both prior art roller latch bolts, such as prior art roller latch bolt 214, and prior art non-roller latch bolts, such as prior art non-roller latch bolt 212. In the new design, the head portion 222 of the improved roller latch bolt 216 of the present invention includes a roller support 240, configured so that the roller 238 is asymmetrically located within the roller support, such that on a sweep side 242 of the roller support 240, the roller 238 protrudes from the roller support 240 and on a latch side 244 of the roller support 240, the roller 238 does not extend beyond the roller support 240.

With particular reference to FIGS. 10A-10B, the body portion 220 of the improved roller latch bolt 216 of the present invention has a longitudinal axis 252 and the roller 238 has an axis of rotation 254. In this improved configuration, the axis of rotation 254 of the roller 238 is perpendicular to the longitudinal axis 252 of the body portion 220 and is offset from the longitudinal axis 252. That is, the roller 238 has a transverse offset 258 from the longitudinal axis 252 of the body portion 220. (See FIG. 10A.)

Figure 13B:
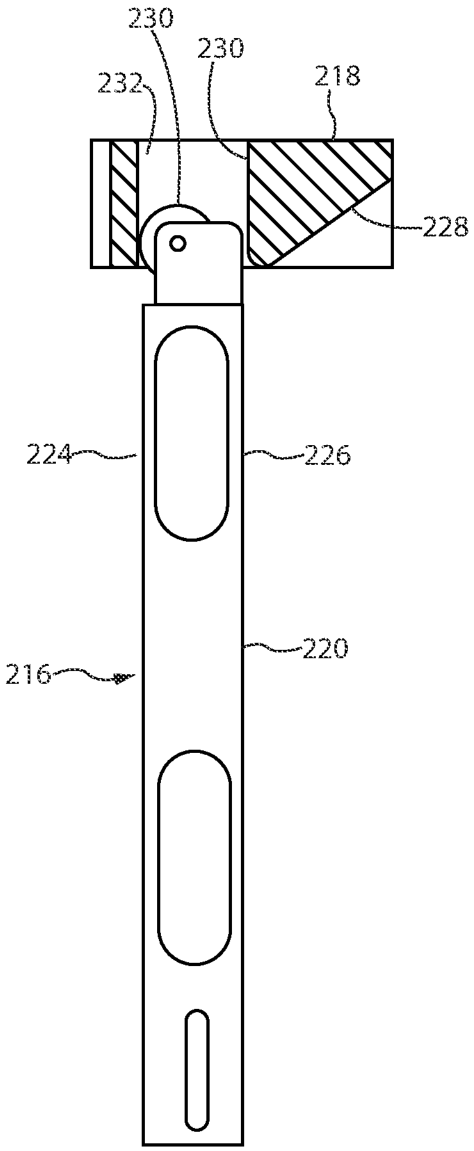
FIG. 13B is a side view of the improved roller latch bolt of the present invention seated in the socket of a strike plate.

The asymmetric positioning of the roller 238 on the improved roller latch bolt 216 of the present invention provides for rolling engagement between the latch bolt and the strike plate 218. That is, the roller 238 of the latch bolt engages with the ramp 228 of the strike plate 218 and consequently provides for smoother door operation and lower door closing force. The asymmetric positioning also, however, allows the latch side 244 of the roller support 240 to extend beyond the roller 238. Consequently, as shown in FIG. 13B, when the improved roller latch bolt 216 of the present invention is seated within the socket 232 of the strike plate 218, the contact surface 234C of the roller support 240 that engages the latch surface 230 of the strike plate is a flat surface.

The flat contact surface 234C of the improved roller latch bolt 216 of the present invention significantly increases the area in contact between the contact surface 234C and the latch surface 230 of the strike plate 218 in comparison to that of the prior art roller latch bolt 214, which only provides line contact at the interface between the contact surface 234B, i.e. a roller, and the latch surface 230 of the strike plate 218.

The roller support 240 may be configured as a dual support, i.e. as a pair of upright supports 246 and 248 (see FIG. 10B), which may, optionally, include a contact plate 250 that spans and interconnects the upright supports 246 and 248 (see FIG. 10C) and is parallel to the axis of rotation of the roller. In the exemplary embodiment, the contact plate 250 is co-planer with a side of the body portion 220. The roller support 240 may also be configured as single upright support with the roller 238 rotatably connected thereto.

In the dual support configuration (see FIG. 10B), the end faces of the upright supports 246 and 248 function as contact surfaces 234C. As the contact surfaces 234C are flat surfaces, substantially more contact area is provided between the contact surfaces 234C and the latch surface 230 of the strike plate 218, than is provided by prior art roller latch bolts, such as prior art latch bolt 214, which provides only line contact between the contact surface and the latch surface 230, i.e., with prior art roller latch bolts, only the roller 238 bears against the latch surface 230 of the strike plate 218. In the dual support with contact plate configuration (see FIGS. 10C and 10D), the contact plate 250 provides fully the same or more surface contact area as is provided by prior art non-roller latch bolts, such as prior art non-roller latch bolt 212.

Increased surface contact area between the latch bolt and the latch surface of the strike plate improves door security as more force is believed to be needed to force open the door than would be required with prior art roller latch bolts that provide for line contact only. In addition, spreading the force over a greater area protects the latch assembly from damage or failure.

In all configurations of the roller support 240, the roller 238 is rotatably connected to the roller support by means of bolts or pins or other means known in the art. Likewise bearings or bushings may be used in the support or supports to decrease friction between the bolts or pins, as is also known in the art.

It will be appreciated that an improved push pad exit device incorporating an improved roller latch bolt have been presented. The foregoing detailed description and appended drawings are intended as a description of the presently preferred embodiment of the invention and are not intended to represent the only forms in which the present invention may be constructed and/or utilized. Those skilled in the art will understand that modifications and alternative embodiments of the present invention which do not depart from the spirit and scope of the foregoing specification and drawings, and of the claims appended below are possible and practical. It is intended that the claims cover all such modifications and alternative embodiments.

The invention claimed is:

1. A push pad exit device for mounting on a door, comprising:
- a push pad actuator mounted horizontally on a surface of the door;
- a latching mechanism, enclosed within a door handle, the door handle mounted vertically on the surface of the door;
- the latching mechanism operable to cause a latch bolt assembly having a latch bolt to engage and disengage with a latching recess in a door frame to transition the door between a first latched position and a second unlatched position;
- the latching mechanism comprising a motion transfer link, a lever arm, and an over-center link, the motion transfer link, lever arm and over-center link being in mechanical connection and having first positions corresponding to the first latched position and second positions corresponding to the second unlatched position;

the push pad actuator having an actuator arm pivotally connected to a housing mounted on the door at one end and engageable at a free end with the motion transfer link of the latch assembly, the actuator arm having a first position corresponding to the first latched position and a second position corresponding to the first unlatched position;

wherein the motion transfer link converts horizontal motion from the push pad actuator into vertical motion in the latching assembly;

wherein the latch bolt assembly biases the actuator arm and latching mechanism to the first latched position;

wherein the application of inwardly directed force to the actuator arm biases the actuator arm and the latching assembly to the second unlatched position;

wherein the motion transfer link and lever arm have lower and upper link ends and the over-center link has three connection points, wherein the lower link end of the motion transfer link engages a connecting tongue of the actuator arm and wherein the upper link end of the motion transfer link engages the lower link end of the lever arm, wherein the upper link end of the lever arm engages a first connection point of the over-center link; a second connection point of the over-center link engaging the latch bolt assembly and wherein a third connection point of the over-center link engages an interior wall surface of the door handle; and the latch bolt is a roller latch bolt, comprising a latch bolt body having a roller support, a roller of the roller latch bolt being rotatably connected to the roller support.

2. The push pad exit device for mounting on a door of claim 1, wherein the latch bolt body has a longitudinal axis, a sweep side and a latch side and the roller of the roller latch bolt has an axis of rotation, wherein a plane on which the axis of rotation extends is perpendicular to a plane on which the longitudinal axis extends and wherein the axis of rotation is offset from the longitudinal axis.

3. The push pad exit device for mounting on a door of claim 2, wherein the roller support comprises two support plates, the roller of the roller latch bolt being disposed between the support plates and rotatably connected to the support plates.

4. The push pad exit device for mounting on a door of claim 3, wherein the roller of the roller latch bolt extends outwardly from the support plates on the sweep side of the latch bolt body and is disposed inwardly of the support plates on the latch side of the latch bolt body.

5. The push pad exit device for mounting on a door of claim 4, wherein the support plates are bridged by a contact plate, wherein the contact plate is parallel to the axis of rotation of the roller of the roller latch bolt.

6. The push pad exit device for mounting on a door of claim 4, wherein the contact plate is co-planer with a side of the latch bolt body.

7. A push pad exit device for mounting on a door, comprising:

a push pad actuator mounted horizontally on a surface of the door;

a latching mechanism, enclosed within a door handle, the door handle mounted vertically on the surface of the door;

the latching mechanism operable to cause a latch bolt assembly having a latch bolt to engage and disengage with a latching recess in a door frame to transition the door between a first latched position and a second unlatched position;

the latching mechanism comprising a motion transfer link, a lever arm, and an over-center link, the motion transfer link, lever arm and over-center link being in mechanical connection and having first positions corresponding to the first latched position and second positions corresponding to the second unlatched position;

the push pad actuator having means for moving a push pad actuator arm from a first position corresponding to the first latched position and a second position corresponding to the first unlatched position;

wherein the motion transfer link converts horizontal motion from the push pad actuator into vertical motion in the latching assembly;

wherein the latch bolt assembly biases the actuator arm and latching mechanism to the first latched position;

wherein the application of inwardly directed force to the actuator arm biases the actuator arm and the latching assembly to the second unlatched position;

wherein means for moving the push pad actuator arm from a first position corresponding to the first latched position and a second position corresponding to the first unlatched position comprises pivotally connecting the push pad actuator arm at one end to the door and engaging another end with the motion transfer link of the latching mechanism;

wherein the parallel linkage assembly comprises first and second parallel links having first and second ends, the second end of the first parallel link connected a first end of a connecting rod, and the second end of the second parallel link connected to a second end of the connecting rod, wherein the first ends of the first and second parallel links are connected to the door; and wherein the latch bolt is a roller latch bolt, comprising a latch bolt body having a roller support, a roller of the roller latch bolt being rotatably connected to the roller support.

8. The push pad exit device for mounting on a door of claim 7, wherein the latch bolt body has a longitudinal axis, a sweep side and a latch side and the roller of the roller latch bolt has an axis of rotation, wherein a plane on which the axis of rotation extends is perpendicular to a plane on which the longitudinal axis extends and wherein the axis of rotation is offset from the longitudinal axis.

9. The push pad exit device for mounting on a door of claim 8, wherein the roller of the roller latch bolt support comprises two support plates, the roller being disposed between the support plates and rotatably connected to the support plates.

10. The push pad exit device for mounting on a door of claim 9, wherein the roller of the roller latch bolt extends outwardly from the support plates on the sweep side of the latch bolt body and is disposed inwardly of the support plates on the latch side of the latch bolt body.

11. The push pad exit device for mounting on a door of claim 10, wherein the support plates are bridged by a contact plate, wherein the contact plate is parallel to the axis of rotation of the roller of the roller latch bolt.

12. The push pad exit device for mounting on a door of claim 11, wherein the contact plate is co-planer with a side of the latch bolt body.

* * * * *